US012582999B2

(12) United States Patent
Erickson et al.

(10) Patent No.: US 12,582,999 B2
(45) Date of Patent: Mar. 24, 2026

(54) TWO-FLUID NOZZLE WITH AN ARCUATE OPENING

(71) Applicant: 3M INNOVATIVE PROPERTIES COMPANY, St. Paul, MN (US)

(72) Inventors: Ryan D. Erickson, Roseville, MN (US); Mark S. Menzenski, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 302 days.

(21) Appl. No.: 18/267,971

(22) PCT Filed: Dec. 17, 2021

(86) PCT No.: PCT/IB2021/061893
§ 371 (c)(1),
(2) Date: Jun. 16, 2023

(87) PCT Pub. No.: WO2022/130303
PCT Pub. Date: Jun. 23, 2022

(65) Prior Publication Data

US 2024/0058827 A1 Feb. 22, 2024

Related U.S. Application Data

(60) Provisional application No. 63/199,298, filed on Dec. 18, 2020.

(51) Int. Cl.
*B05B 7/02* (2006.01)
*B05B 7/06* (2006.01)
*B05B 7/24* (2006.01)

(52) U.S. Cl.
CPC .............. *B05B 7/025* (2013.01); *B05B 7/061* (2013.01); *B05B 7/066* (2013.01); *B05B 7/2478* (2013.01)

(58) Field of Classification Search
CPC ......... B05B 7/025; B05B 7/061; B05B 7/066; B05B 7/067; B05B 7/2478; B05B 7/2481
(Continued)

(56) References Cited

U.S. PATENT DOCUMENTS 1,718,556 A * 6/1929 Harrison ................. F23D 11/10 239/597
3,189,078 A * 6/1965 Davidsson ................ F23K 5/04 137/169

(Continued)

FOREIGN PATENT DOCUMENTS

GB 313122 A 8/1930
GB 636397 A 4/1950

(Continued)

OTHER PUBLICATIONS

International Search Report for PCT International Application No. PCT/IB2021/061893, mailed on Mar. 14, 2022, 3 pages.

*Primary Examiner* — Steven J Ganey
(74) *Attorney, Agent, or Firm* — Martha J. Engel; Jonathan V. Sry

(57) ABSTRACT

Aspects of the present disclosure describe a two-fluid nozzle including a nozzle body. The nozzle body includes a first fluid nozzle tip having a first fluid opening formed therein. The nozzle body includes a second fluid nozzle tip comprising a second fluid opening formed therein. The first fluid nozzle tip and second fluid nozzle tip can be fluidically isolated from each other in the nozzle body. The first fluid opening and second fluid opening are each arcuate and rectangular. The second fluid opening is positioned adjacent to the first fluid opening such that, when flowing, the second fluid from the second fluid opening affects the first fluid from the first fluid opening of a first tubular member.

20 Claims, 14 Drawing Sheets

(58) Field of Classification Search
USPC ........ 239/296–299, 424–425, 327, 382, 567, 239/597–599, 601
See application file for complete search history.

(56) References Cited

U.S. PATENT DOCUMENTS

| | | | | |
|---|---|---|---|---|
| 3,635,400 | A | 1/1972 | Nord et al. | |
| 4,055,300 | A | 10/1977 | Binoche | |
| 4,273,287 | A | 6/1981 | Huber | |
| 6,040,016 | A * | 3/2000 | Mitani | B05C 5/02 239/296 |
| 6,082,637 | A * | 7/2000 | Ludwig | B05C 5/02 239/296 |
| 7,793,859 | B2 | 9/2010 | Kolb et al. | |
| 9,073,068 | B2 | 7/2015 | Krayer et al. | |
| 9,782,784 | B2 | 10/2017 | Schmon et al. | |
| 10,415,219 | B2 | 9/2019 | Bamford | |
| 10,589,300 | B2 | 3/2020 | Bewlay et al. | |
| 2008/0276975 | A1 | 11/2008 | Disch et al. | |

FOREIGN PATENT DOCUMENTS

| | | | |
|---|---|---|---|
| WO | 2007145107 | A1 | 12/2007 |
| WO | 2018104870 | A1 | 6/2018 |

* cited by examiner

TWO-FLUID NOZZLE WITH AN ARCUATE OPENING

BACKGROUND

Atomizers are devices that transform bulk fluids into a fine spray or mist of droplets. The size and shape of an atomizer can depend upon the desired application and/or delivery system. Applications over the years have included delivery of first fluid hydrocarbon feeds in fluidized catalytic cracking processes, dispensing of chemical insecticides, and application of surface coatings.

Atomizers are currently utilized in hand-held pneumatic spray guns that can be used, for example, in vehicle repair body shops to apply fluid coating media such as primer, paint and/or clearcoat to vehicle parts. Typically, the spray gun is made of solid metal or plastic and includes a platform and spray head assembly. The spray head assembly includes a nozzle for dispensing the fluid, one or more atomizing air outlets to atomize the fluid as it exits the nozzle, and two or more shaping air outlets to shape the atomized fluid into the desired spray pattern. The spray gun contains a series of internal passages that distribute air from an air supply manifold in the platform to the atomizing air outlet(s) and shaping air outlets in the spray head assembly. Atomization of fluids by this technique is sometimes referred to as air-atomizing, air-spray, air-assist or air-blast atomization, and an exemplary spray gun using such a technique is disclosed, for example, in WO 2018/104870 and illustrated in FIG. 1.

Atomizers can be used to atomize fluids in a fan-shaped spray pattern. U.S. Pat. No. 7,793,859 describes a nozzle having two, spaced apart parallel slots to atomize a hydrocarbon feed. The two parallel slots dispense the same atomized hydrocarbon feed (external-mix). The nozzle does not segregate the first fluid and a second fluid.

Two-fluid nozzles have been used to dispense fan-shaped spray patterns. These two-fluid nozzles exist in a variety of configurations but may consume excessive amounts of second fluid (e.g., gas).

Internal-mix two-fluid nozzles can be used to reduce second fluid consumption.

For example, U.S. Pat. No. 3,635,400 and G.B. Pat. No. 636, 397 describe a rectangular slot as an exterior opening for an atomized liquid/gas mixture, however the nozzle is configured as an internal-mix two-fluid nozzle with the liquid and gas being independently discharged within a mixing cavity before being discharged through the rectangular slot. Such a configuration could result in backflow issues depending on relative pressures of the liquid and gas supply passages and the mixing cavity.

External-mix two-fluid nozzles do not have an internal mixing cavity. The first fluid and second fluid streams meet outside of the external-mix two-fluid nozzle. They often incorporate two distinct gas passages into the spray nozzle to 1) assist in atomizing the first fluid and 2) shape the resulting spray pattern, respectively. The separate gas passage for shaping the spray pattern traditionally includes opposing "air horns" (e.g., 116 in FIG. 1) which can emit high velocity gas jets which impinge upon the atomized spray and spread it out spatially. The air horns can consume significant amounts of second fluid.

For example, U.S. Pat. Nos. 4,055,300 and 9,782,784 describe a rectangular or elliptical slot as outlets to discharge liquids and gases but use air horns with multiple passageways to control the resulting shape of the spray pattern. This arrangement can cause an excessive consumption of the second fluid. Further, neither have two arcuate nozzles.

U.S. Pat. No. 4,273,287 describes a nozzle having an elliptical slot that dispenses first fluid while offset orifices dispense second fluid. The first fluid itself is pressurized in addition to being shaped by the second fluid.

SUMMARY

Aspects of the present disclosure relate to a two-fluid nozzle. The two-fluid nozzle can include a nozzle body. The nozzle body includes a first fluid nozzle tip having a first fluid opening formed therein. The first fluid opening is configured to provide a first fluid from a first fluid passageway inlet via a first fluid passageway. The nozzle body includes a second fluid nozzle tip comprising a second fluid opening formed therein. The second fluid opening is configured to provide a second fluid from a second fluid passageway inlet via a second fluid passageway. The first fluid passageway and the second fluid passageway are at least partially within the nozzle body and are fluidically isolated from each other in the nozzle body. The first fluid opening and second fluid opening are each arcuate and rectangular. The second fluid opening is positioned adjacent to the first fluid opening such that, when flowing, the second fluid from the second fluid opening affects the first fluid from the first fluid opening of a first tubular member.

In at least one embodiment, the two-fluid nozzle is an external-mix two-fluid nozzle. In at least one embodiment, a distal-most portion of the second fluid nozzle tip does not extend beyond a distal-most portion of the first fluid nozzle tip.

In at least one embodiment, the nozzle body comprises an exterior surface, the exterior surface of the nozzle body is not configured to contact either the first fluid or second fluid. In at least one embodiment, the exterior surface faces an ambient environment.

In at least one embodiment, the first fluid nozzle tip is fan-shaped with a leaf cavity formed therein. In at least one embodiment, the first fluid opening is arranged in a longitudinal plane of the two-fluid nozzle. In at least one embodiment, the first fluid nozzle tip comprises an arcuate edge, the arcuate edge partially defines an outer arcuate edge height dimension of the first fluid opening. In at least one embodiment, the outer arcuate edge height dimension is greater than a height dimension proximate to a protruding portion within the first fluid passageway. In at least one embodiment, the first fluid nozzle tip has a rectangular cross-sectional area taken in a frontal plane of the two-fluid nozzle. In at least one embodiment, the first fluid opening has an outer arcuate edge height dimension defined within a longitudinal plane of the two-fluid nozzle that is greater an outer arcuate edge width dimension defined within a transverse plane of the two-fluid nozzle.

In at least one embodiment, the first fluid nozzle tip is fluidically coupled to the first fluid passageway inlet via the first tubular member and the second fluid nozzle tip is fluidically coupled to the second fluid passageway inlet via a second tubular member. In at least one embodiment, the first tubular member or second tubular member have a non-uniform cross-section throughout a longitudinal plane of the two-fluid nozzle. In at least one embodiment, the second tubular member comprises a cone-shaped portion that tapers into the second fluid nozzle tip, wherein an interior surface of cone-shaped portion forms a chamber. In at least one embodiment, a dome-shaped portion has a dome face, the second fluid opening is defined by a dome interior edge comprising a plurality of dome interior edge portions. In at least one embodiment, the second fluid opening comprises a plurality of second fluid opening portions, each second fluid opening portion is defined by gaps between a dome interior edge portion from a plurality of dome interior edge portions and an adjacent arcuate edge portion from a plurality of arcuate edge portions. In at least one embodiment, a majority of the arcuate edge follows contours of the dome-shaped portion. In at least one embodiment, the second fluid opening is formed within the dome-shaped portion, and the first fluid opening is located within the second fluid opening. In at least one embodiment, the first fluid opening is parallel to the second fluid opening or at least two second fluid opening portions thereof.

In at least one embodiment, at least a portion of the first fluid passageway is coaxial with the second fluid passageway.

In at least one embodiment, the first fluid passageway and second fluid passageway are integrally formed. In at least one embodiment, an arcuate edge is formed of metal and the second fluid nozzle tip is formed of polymer, the second fluid nozzle tip is overmolded over the arcuate edge. In at least one embodiment, the first fluid nozzle tip is formed of polymer, and the second fluid nozzle tip is formed of metal.

In at least one embodiment, the first fluid opening establishes a first longitudinal plane; wherein the second fluid opening establishes a second longitudinal plane, the second longitudinal plane is parallel to the first longitudinal plane.

In at least one embodiment, the second fluid opening at least partially surrounds the first fluid opening. In at least one embodiment, the second fluid opening completely surrounds the first fluid opening. In at least one embodiment, the second fluid opening is formed in the dome face of the dome-shaped portion is formed by a dome interior edge having a perimeter, an arcuate edge is spaced apart on at least two sides from the perimeter. In at least one embodiment, the arcuate edge of the first tubular member is spaced apart on all sides from the perimeter.

In at least one embodiment, the second fluid nozzle tip is partitioned into two or more sections.

In at least one embodiment, the first fluid nozzle tip is partitioned into two or more sections to create a plurality of openings.

In at least one embodiment, the first fluid nozzle tip comprises a baffle wall disposed parallel to the transverse plane. In at least one embodiment, the baffle wall and an arcuate edge portion define an opening.

In at least one embodiment, the first tubular member is configured to have an askew bend.

In at least one embodiment, the first fluid passageway inlet comprises a connection member that is configured to connect in a fluid-tight manner to a container so that first fluid is fully contained in the container. In at least one embodiment, the container is in a gravity-fed or siphon-fed configuration relative to the two-fluid nozzle.

In at least one embodiment, the second fluid passageway inlet comprises a connection member configured to mate with a second fluid source in a fluid-tight manner so that second fluid is fully contained in the second fluid source without leakage.

In at least one embodiment, the second fluid source is a compressed air blower gun.

In at least one embodiment, the two-fluid nozzle does not have air-horns that extend laterally beyond the second fluid nozzle tip.

In at least one embodiment, the first fluid opening and second fluid opening are each arcuate when viewed along the longitudinal plane, and each rectangular when viewed along the frontal plane.

In at least one embodiment, the two-fluid nozzle does not include air horns.

Additional aspects of the present disclosure include a spraying apparatus. The spraying apparatus can include the two-fluid nozzle. The spraying apparatus can also include a first fluid source comprising a container fluidically coupled to the two-fluid nozzle and a second fluid source fluidically coupled to the two-fluid nozzle.

Additional aspects of the present disclosure relate to a method of using a spraying apparatus. The method can include attaching the container to the two-fluid nozzle. The method can include placing the two-fluid nozzle in front of a substrate. The method can include attaching the second fluid source to the two-fluid nozzle. The second fluid source is configured to provide no greater than 3 standard cubic feet of air per minute at 90 PSI The method can include dispensing the first fluid and the second fluid. The method can include atomizing at least a portion of the first fluid to produce a flat fan pattern of atomized fluid. The method can include coating the substrate with the atomized fluid. The coating can achieve a coating area of 12 square inches at an 8-inch distance from the substrate.

In at least one embodiment, the method can include dispensing second fluid from the second fluid passageway outlet, producing a negative pressure on first fluid opening, and dispensing and atomizing a first fluid from the first fluid opening without shaping by an air horn. In at least one embodiment, the coating can be shaped in a fan-pattern using only the first fluid nozzle tip and the second fluid nozzle tip and not an air horn.

The above summary of the present disclosure is not intended to describe each disclosed embodiment or every implementation of the present disclosure. The description that follows more particularly exemplifies illustrative embodiments.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

In one aspect of the present disclosure, the two-fluid nozzle can use arcuate and rectangular openings for each fluid to create a flat fan spray pattern of atomized fluid for use in a variety of applications, including the application of coating media such as primer, paint and/or clearcoat to vehicle parts. The openings can be adjacent so that the first fluid can be drawn using the Venturi effect without the need for separate pressurization of the first fluid. Further, the shaping can be performed using the second fluid opening and not laterally projecting air horns.

The two-fluid nozzle of the present disclosure may reduce air consumption, reduce noise generation, reduce power consumption and/or increase coating transfer efficiency when contrasted with a current hand-held spraying apparatus. Although the two-fluid nozzle of the present disclosure is designed to address some of the drawbacks associated with the current hand-held spraying apparatus as mentioned above, it should be understood that the two-fluid nozzle disclosed herein could be easily configured for other devices and/or applications requiring the atomization of fluid.

Figure 1:
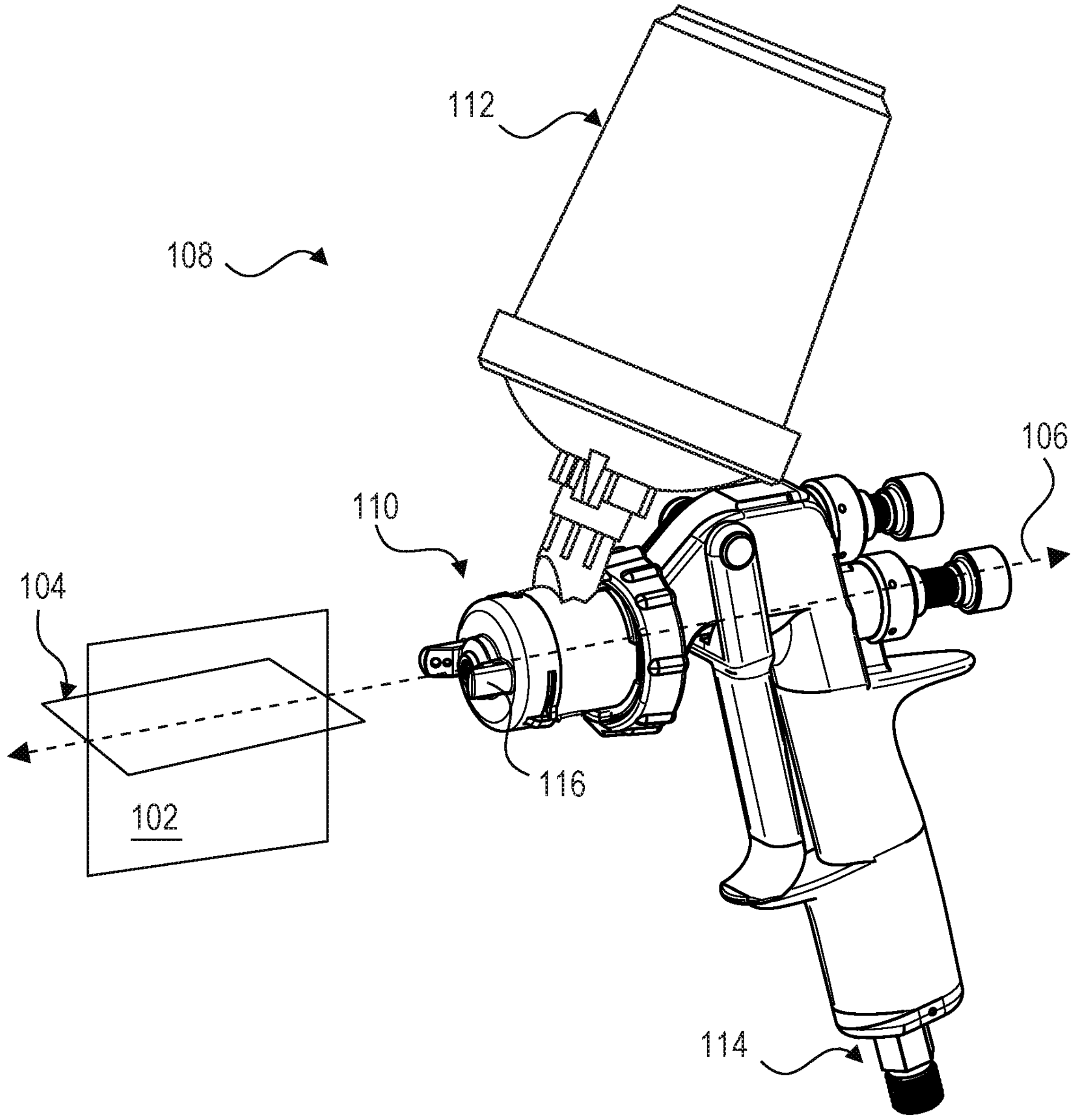
FIG. 1 illustrates a perspective view of a current air-assist first fluid spray gun in accordance with one embodiment.

FIG. 1 illustrates an exemplary spraying apparatus 108. The spraying apparatus 108 can have a nozzle 110 that is configured to spray the first fluid using a second fluid. The nozzle 110 can include a pair of air-horns 116. The spraying apparatus 108 can be arranged along a longitudinal axis 106 and is rotatable around the longitudinal axis 106. Both the longitudinal plane 102 and transverse plane 104 can intersect the longitudinal axis 106.

In at least one embodiment, the longitudinal plane 102 can be aligned with the container 112, the second fluid second fluid passageway inlet 114 and a portion of the nozzle 110. This particular spraying apparatus 108 can be arranged to spray such that the liquid is aligned along a longitudinal plane 102. The nozzle 110 can have air-horns 116 that are aligned according to a transverse plane 104. The base of the nozzle 110 can be aligned along a frontal plane (not shown).

In at least one embodiment, the longitudinal plane 102 can be defined by nozzle 110 or the spray pattern. For example, a vertical spray pattern dispensed by the spraying apparatus 108 can define part of the longitudinal plane 102 (in addition to the fluid flow. In one example, the air-horns 116 can be aligned with the transverse plane 104.

Figure 2:
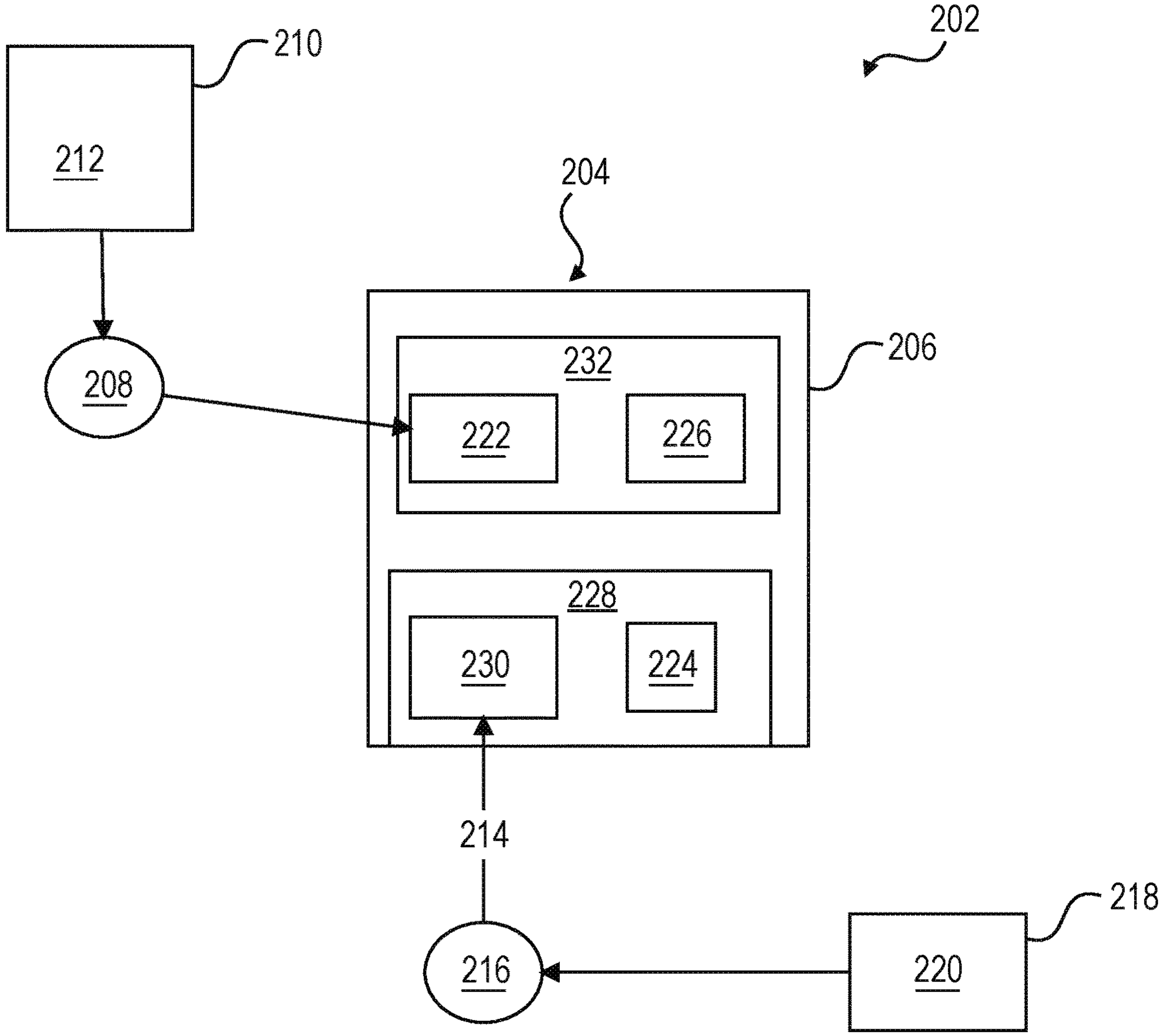
FIG. 2 illustrates a block diagram of a spraying apparatus in accordance with one embodiment.

FIG. 2 illustrates a spraying apparatus 202 with a two-fluid nozzle 204. The two-fluid nozzle 204 can be formed from a nozzle body 206 which can be a single integral nozzle body or be formed of a plurality of separate nozzle bodies. Two-fluid nozzles 204 of the present application can be assembled from two or more parts or integrally formed from a single material using a number of known techniques, including injection molding, compression molding, machining, 3D printing, forging, casting and combinations thereof. Any suitable material(s) may be used to make the two-fluid nozzle 204, e.g., thermoplastics such as polypropylene, nylon, polytetrafluoroethylene, or acetal; metals such as brass and stainless steel; ceramics such as aluminum oxide; and combinations thereof. For example, the nozzle body 206 can be the combination of a first fluid nozzle and a second fluid nozzle that are formed separately and then combined.

In at least one embodiment, the two-fluid nozzle 204 can be configured to receive two separate fluids, in an uncombined state, and then combine the first fluid and the second fluid adjacent to a distal-most portion the nozzle body 206. In at least one embodiment, the combination of the two fluids can occur just outside of the nozzle body 206 (external-mix two-fluid nozzle). In at least one embodiment, the combination of the two fluids can occur just inside of the nozzle body 206 (internal-mix two-fluid nozzle).

The nozzle body 206 can have a first fluid passageway 228 and second fluid passageway 232 formed therein. For example, the nozzle body 206 can have one or more internal features that form the first fluid passageway 228 or second fluid passageway 232. For example, the nozzle body 206 can have a plurality of tubular members disposed within the nozzle body 206 that transport the fluid. Various nozzle bodies 206 are described herein. The first fluid passageway 228 can have a first fluid passageway inlet 230 and a first fluid passageway outlet 224 each formed with structural elements. The second fluid passageway 232 can also have second fluid passageway inlet 222 and second fluid passageway outlet 226 each formed with structural elements. For example, the first fluid passageway outlet 224 and second fluid passageway outlet 226 can be formed from openings in the nozzle body 206.

The spraying apparatus 202 can include a first fluid source 218 having a first fluid 220 contained therein and a second fluid source 210 having a second fluid 212 contained therein. In at least one embodiment, the first fluid can be a liquid such as paint, lacquer, stain, varnish, water, or combinations thereof. In at least one embodiment, the second fluid 212 is air, nitrogen, oxygen, steam, or combinations thereof. The spraying apparatus 202 may be used, for example, in vehicle repair body shops to apply first fluid coating media such as primer, paint and/or clearcoat to vehicle parts. In such applications, the second fluid 212 can be pressurized air. The first fluid 220 may be, but is not required to be, pressurized. In some embodiments, the first fluid 220 not pressurized by means other than hydrostatic pressure.

The first fluid source 218 is fluidly connected to the first fluid passageway inlet 230, and the second fluid source 210 is fluidly connected to the second fluid passageway inlet 222 using various attachment features. The attachment is preferably releasable but may be permanent in some embodiments.

The first fluid source 218 or second fluid source 210 may comprise any suitable container, reservoir or housing that can be directly or indirectly (e.g., via a conduit) attached to the first fluid passageway inlet 230 or second fluid passageway inlet 222, respectively, of the nozzle body 206. The first fluid source 218 or second fluid source 210 can each be reusable or disposable and can come prefilled with fluid or be fillable on site.

In some embodiments, at least one of the first fluid source 218 and second fluid source 210 is pressurized. In some embodiments, the first fluid source 218 is not internally pressurized. In other embodiments, the first fluid source 218 is not pressurized by means other than hydrostatic pressure (e.g., the first fluid source 218 is positioned vertically above the nozzle body 206, meaning along a longitudinal plane and above the nozzle body 206 such that gravity will cause the first fluid 220 to create an internal pressure in a container).

The spraying apparatus 202 may optionally include one or more actuators to manage the fluid flow within the apparatus. A second fluid actuator 208 manages the flow of second fluid 212 from the second fluid source 210 to the second fluid passageway inlet 222. In one embodiment, the second fluid actuator 208 can be a compressed-air blow gun. Similarly, first fluid actuator 216 manages the flow of first fluid 220 from the first fluid source 218 to the first fluid passageway inlet 230. The first fluid actuator 216 and second fluid actuator 208 can be of the same type or different types. Exemplary actuators include hand triggers, needle valves, ball valves, poppet valves, cross-slit valves, dome valves, duckbill valves, umbrella valves and combinations thereof.

The spraying apparatus 202 can be used in a variety of applications involving the atomization of fluid. In one embodiment, the spraying apparatus 202 is used to coat a substrate. The nozzle body 206 is placed in front of a substrate (not shown). If in a siphon-fed configuration, the first fluid 220 can be directed through a siphon tube 214 and into a first fluid passageway outlet 224 while the second fluid 212 is directed through the second fluid passageway outlet 226. At least a portion of the first fluid 220 is atomized by the second fluid 212 to produce a flat fan-shaped pattern of atomized fluid. The substrate is then coated with the atomized fluid.

FIG. 3A-FIG. 3F illustrate a nozzle body 302 that is an embodiment of nozzle body 206. The nozzle body 302 can have a front surface 328, a rear surface 326, and a longitudinal axis 324 extending from the front surface 328 to the rear surface 326 (which can also define a longitudinal plane).

In at least one embodiment, the front surface 328 can be defined by the front of the nozzle body 302, e.g., a first fluid nozzle tip 318 or a second fluid nozzle tip 388. In at least one embodiment, the front surface 328 can be defined by the distal-most portion of the nozzle body 302 (or a nozzle tip or opening thereof).

In at least one embodiment, the rear surface 326 can be defined by the rear of the nozzle body 302. As shown, the rear surface 326 forms part of a second fluid passageway inlet 364. The longitudinal axis 324 can be further defined by the flow of the second fluid within the second fluid passageway 308.

A first fluid passageway inlet 306*a* and a second fluid passageway inlet 310*a* can each form independent passageways for a first fluid passageway 304 and a second fluid passageway 308 and are formed within a portion of the nozzle body 302 therein.

The first fluid passageway 304 is disposed within the nozzle body 302 to fluidically couple the first fluid passageway inlet 306*a* and the first fluid passageway outlet 306*b*.

The first fluid passageway 304 can be formed from the first fluid nozzle tip 318 and a first tubular member 316.

In at least one embodiment, the first fluid passageway 304 can be at least partially formed from a first tubular member 316 which can define a part of the first fluid passageway 304. The first tubular member 316 includes exterior surface 336*a* and interior surface 336*b*. The first fluid can primarily contact the interior surface 336*b* but may contact the exterior surface 336*a* in a region adjacent to the first fluid opening 322.

Figure 3A:
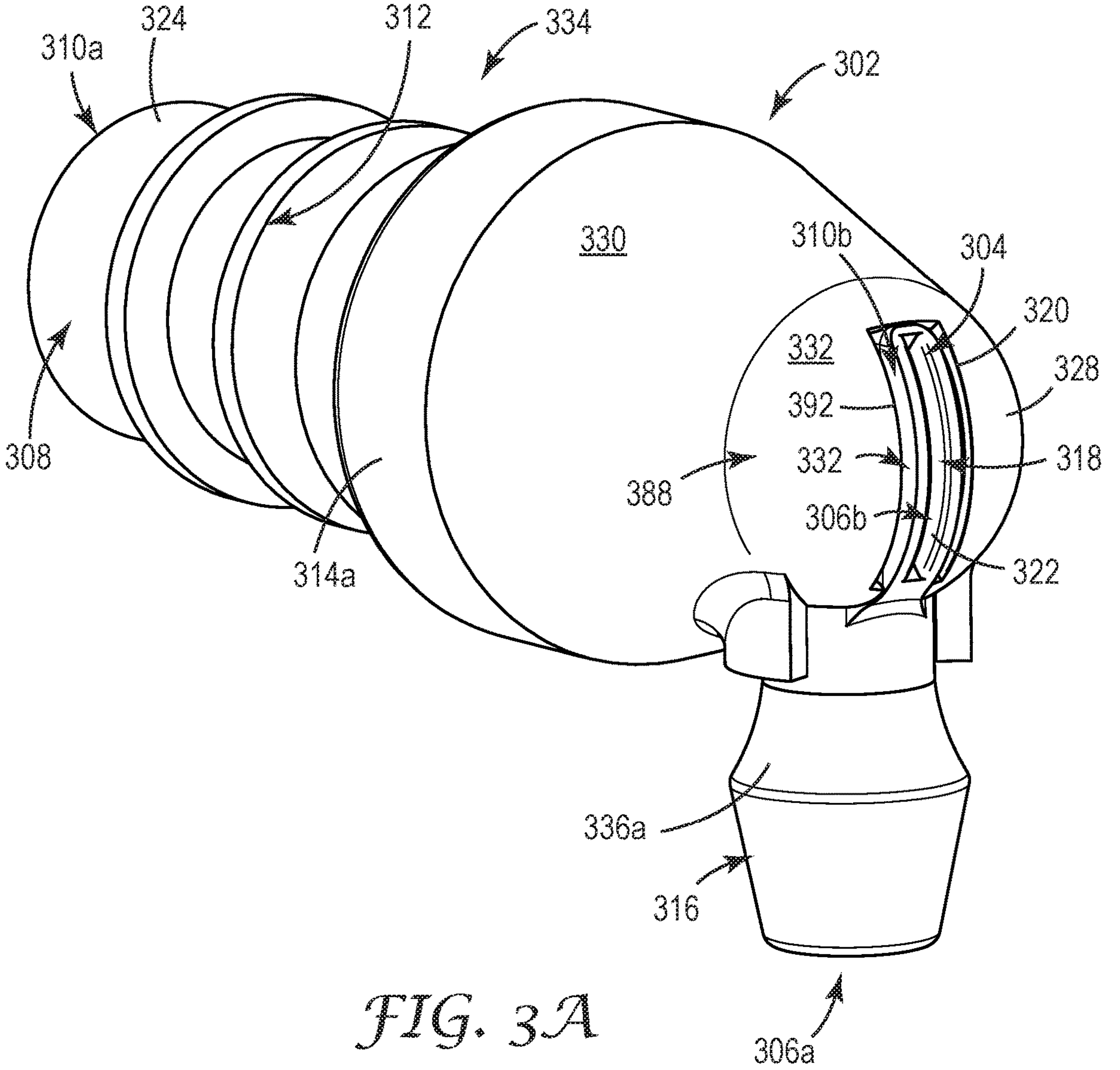
FIG. 3A is a perspective view of one embodiment of a nozzle body.
Figure 3B:
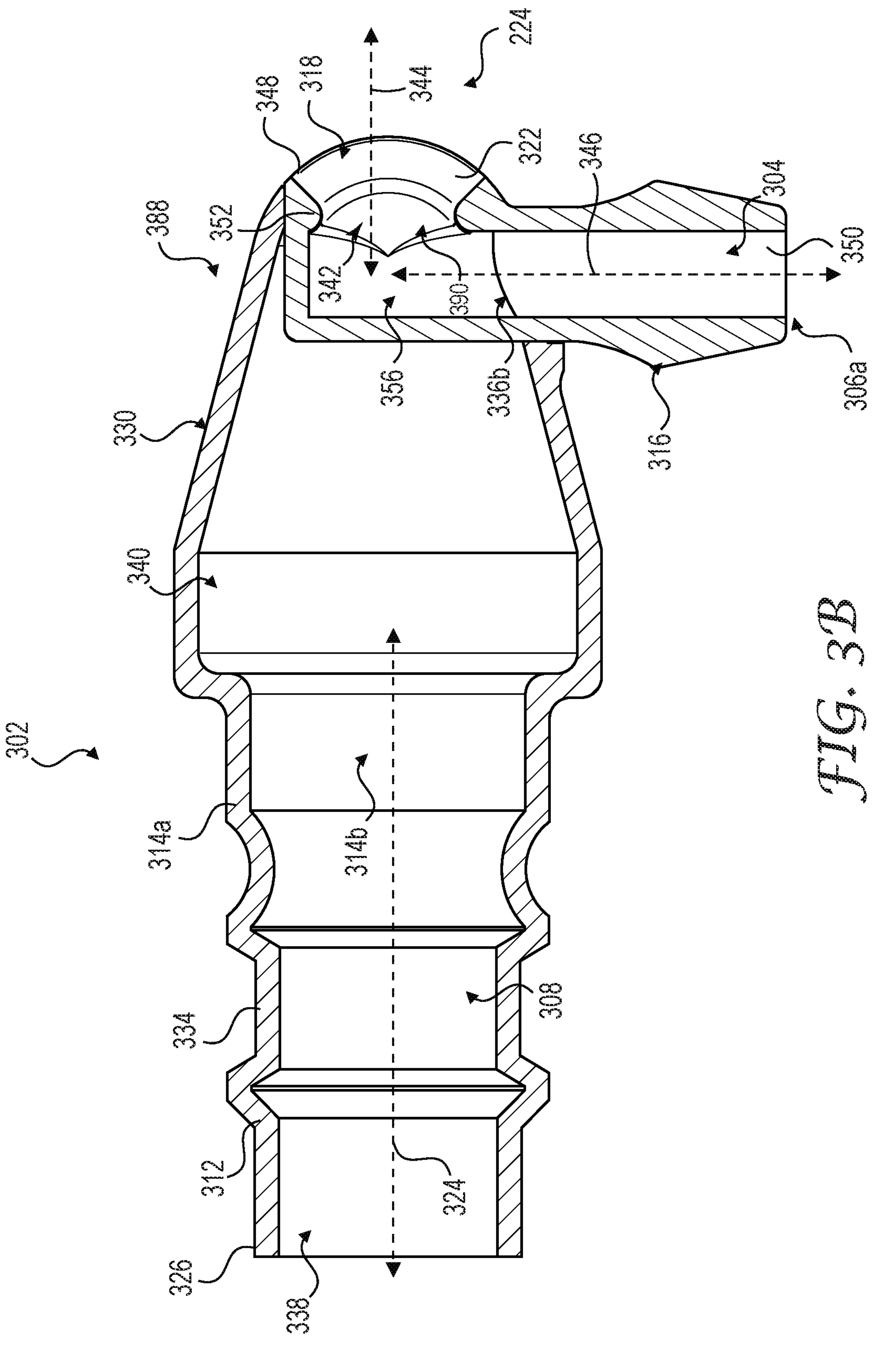
FIG. 3B is a side cross-sectional view of the nozzle body of FIG. 3A taken along a longitudinal plane.

As shown in FIG. 3B, the first tubular member 316 can have an opening 350 that corresponds to the first fluid passageway inlet 230. The other opening 390 can lead into the first fluid nozzle tip 318. The openings can be formed from the first tubular member 316 itself.

The first tubular member 316 can be arranged along a single axis but is shown as being aligned along two axes, liquid inlet axis 346 and liquid outlet axis 344. In at least one embodiment, the liquid inlet axis 346 and liquid outlet axis 344 can intersect to produce an askew bend 356 in first fluid passageway 228 defined by the placement of the opening 390. In one example, the first fluid passageway outlet 306*b* and first fluid passageway inlet 230 are arranged perpendicular to each other. For example, the liquid inlet axis 346 and liquid outlet axis 344 can form an angle of between 80 and 100 degrees.

In at least one embodiment, the opening 390 is formed in the interior surface 336*b* and defined by the protruding portions 352. For example, the liquid outlet axis 344 can be defined by the opening 390 and first fluid opening 322. In at least one embodiment, the protruding portion 352 can be proximate to the intersection of liquid outlet axis 344 and liquid inlet axis 346. The corners formed at the protruding portion 352 may be squared, rounded or a combination thereof. In at least one embodiment, the liquid outlet axis 344 is coaxial with or parallel to the longitudinal axis 324 of the nozzle body 302 or second fluid passageway 308.

In at least one embodiment, the first fluid nozzle tip 318 can expand outward along a single plane coplanar with the liquid inlet axis 346 and extending along the liquid outlet axis 344. In at least one embodiment, the arcuate edge portion 374*a* and arcuate edge portion 374*b* can form an angle 372 that establishes the overall liquid spread in the longitudinal plane. For example, the total range of angle 372 can be from 0 to 180 degrees, or 0 to 120 degrees. The fan-shape can form a half-angle relative to liquid outlet axis 344. In at least one embodiment, the half-angle is from 0 to 80 degrees from the liquid outlet axis 344.

Figure 3C:
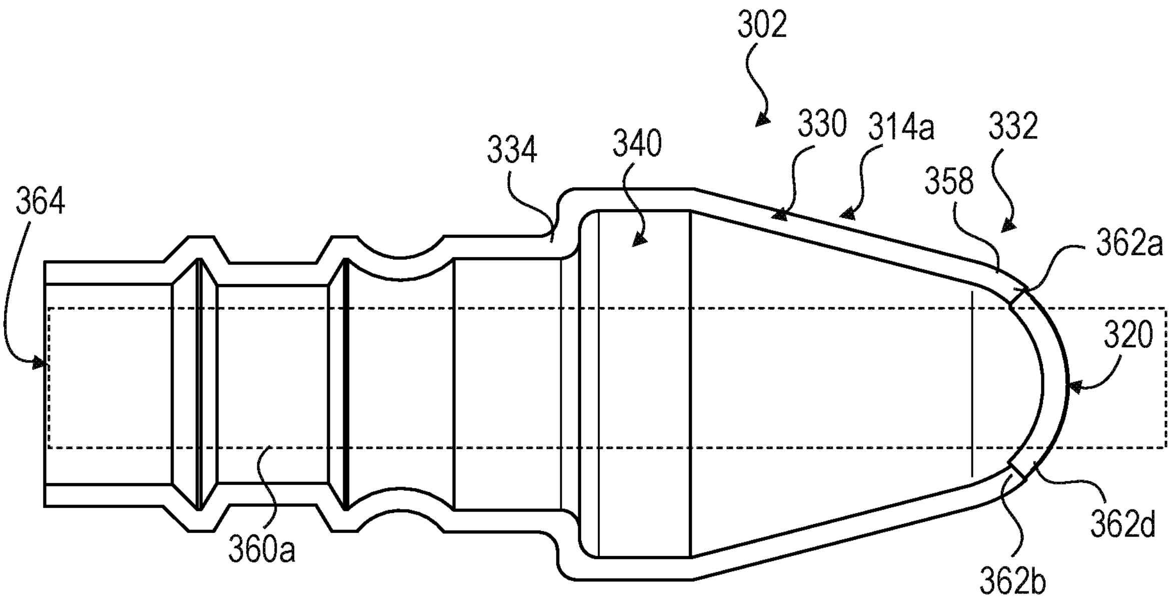
FIG. 3C is a side cross-sectional view of the second fluid passageway of FIG. 3A-FIG. 3B taken along a longitudinal plane.
Figure 3D:
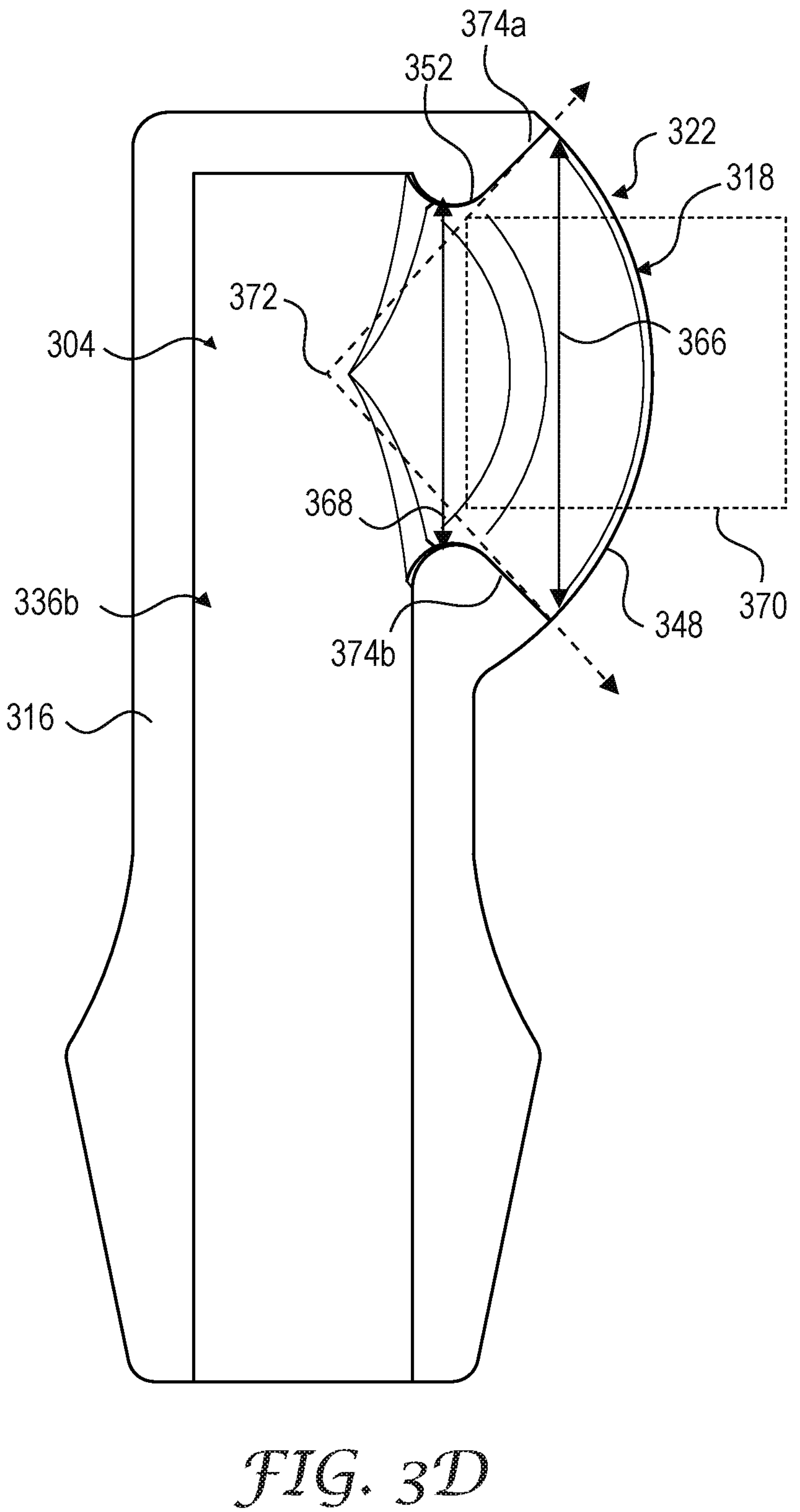
FIG. 3D is a side cross-sectional view of the first fluid passageway of FIG. 3A-FIG. 3C taken along a longitudinal plane.
Figure 3E:
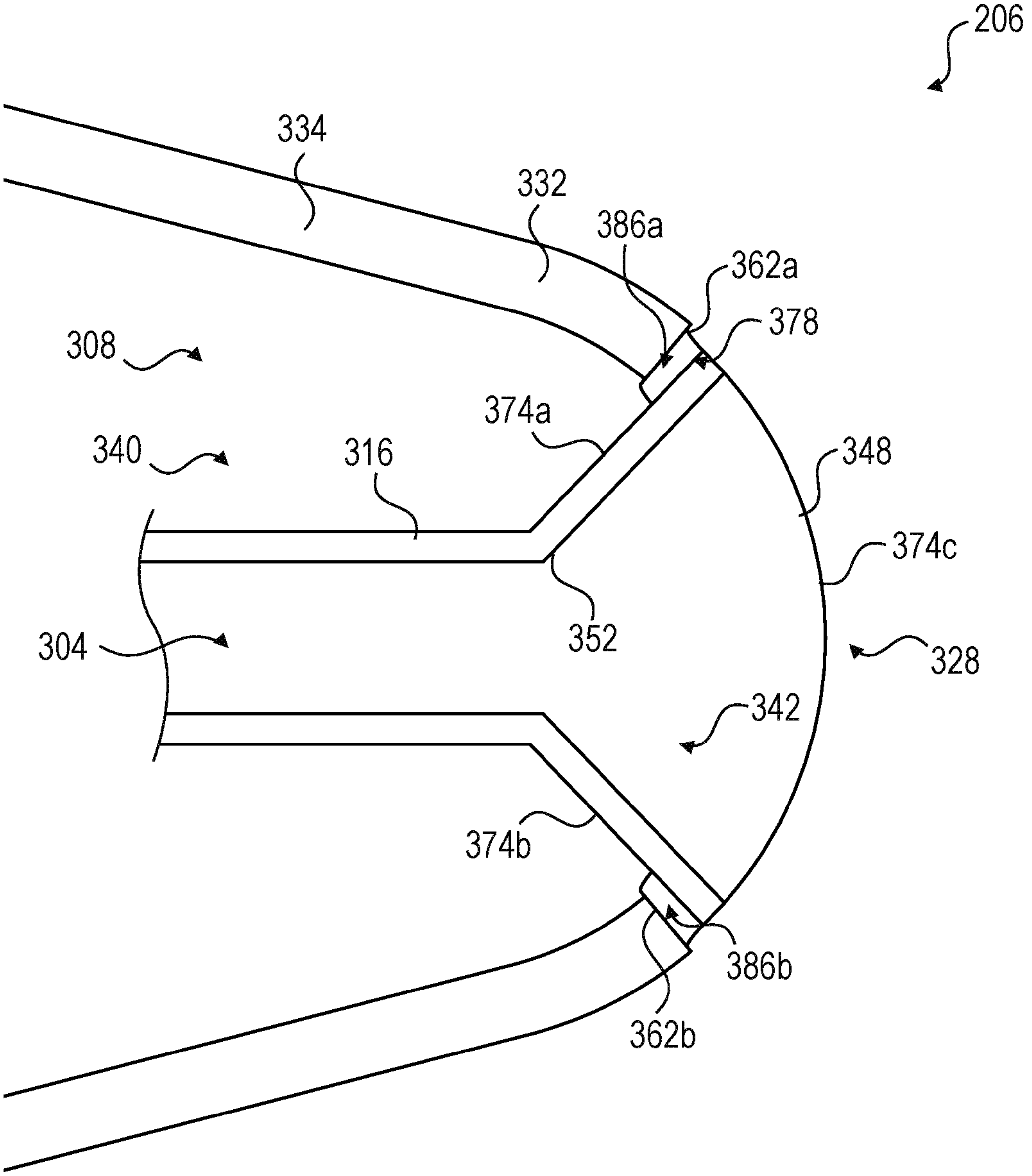
FIG. 3E is a side cross-sectional view of the nozzle body of FIG. 3A-FIG. 3D taken along a longitudinal plane.

As shown in FIG. 3B and FIG. 3E, a leaf cavity 342 can be formed adjacent to the arcuate edge 348 and within the interior surface 336*b*. In at least one embodiment, the leaf cavity 342 expands outward in the longitudinal plane and not, e.g., in the transverse plane. The leaf cavity 342 can be used to agitate the first fluid before the first fluid is atomized in a fan-shape in the liquid inlet axis 346 or along the frontal plane. The leaf cavity 342 can be bordered by the protruding portion 352 which may concentrate the first fluid passageway 228 before the first fluid is atomized in the fan shape. The first tubular member 316 can form the protruding portion 352 on the interior surface 336*b*. In at least one embodiment, the leaf cavity 342 can be the result of changing directions of the liquid flow using the first tubular member 316. In at least one embodiment, the first tubular member 316 can have an arcuate edge portion 374*a*, arcuate edge portion 374*b* opposite from arcuate edge portion 374*a*, arcuate edge portion 374*c*, and an opposing arcuate edge portion 374*d* that forms part of the leaf cavity 342.

As shown in FIG. 3D, the fan-shape of the first fluid nozzle tip 318 can have first fluid opening height dimension 368 and outer arcuate edge height dimension 366. The outer arcuate edge height dimension 366 is larger than first fluid opening height dimension 368 such that first fluid expands while exiting the first fluid opening 322. In at least one embodiment, the first fluid nozzle tip 318 can produce a fan-shaped pattern when dispensing first fluid without having to pre-pressurize the first fluid.

In at least one embodiment, the fan-shaped pattern can define the longitudinal plane 370 of the nozzle body 302. For example, if the fan-shaped pattern of the first fluid is slightly askew from a vertical orientation, then the longitudinal plane 370 (and transverse plane) of the nozzle body 302 can be based off of the spray pattern applied.

The first fluid opening 322 can be aligned along longitudinal plane 370 which can be parallel to longitudinal plane 360*a* (shown in FIG. 3C) which can be aligned with at least one of the second fluid openings 320.

In at least one embodiment, a portion of the fan-shape can be established by the protruding portion 352 and the arcuate edge 348 (which can form part of the first fluid opening 322).

As illustrated in FIG. 3D, each of the corners is rounded to reduce or eliminate secondary flows that may occur with squared or sharp corners. Secondary flows can produce eddies and vortices that may disrupt the uniformity of the atomized fluid spray pattern. The interior surface 336*b* of the first tubular member 316 can include one or more features (e.g., grooves, partitions, vortex generators, pillars/posts, and various textures).

In at least one embodiment, the first fluid nozzle tip 318 and first tubular member 316 can be integrally molded or attachable. In at least one embodiment, a portion of the first fluid nozzle tip 318 can be a harder material that is overmolded with a softer material (based on Shore A hardness).

In at least one embodiment, the first fluid passageway outlet 306*b* can be associated with a first fluid opening 322 formed from the first fluid nozzle tip 318. The first fluid can exit the nozzle body 302 through the first fluid opening 322 formed in the first fluid nozzle tip 318. In at least one embodiment, the first fluid opening 322 is configured to dispense first fluid into a second fluid.

The first fluid opening 322 that is defined by the arcuate edge 348 (e.g., an arcuate edge portion 374*a*, arcuate edge portion 374*b*, and arcuate edge portion 374*c*) formed in the first fluid nozzle tip 318 as shown in FIG. 3E. In at least one embodiment, the arcuate edge 348 defines a portion of the front surface 328 of the nozzle body 206.

Figure 3F:
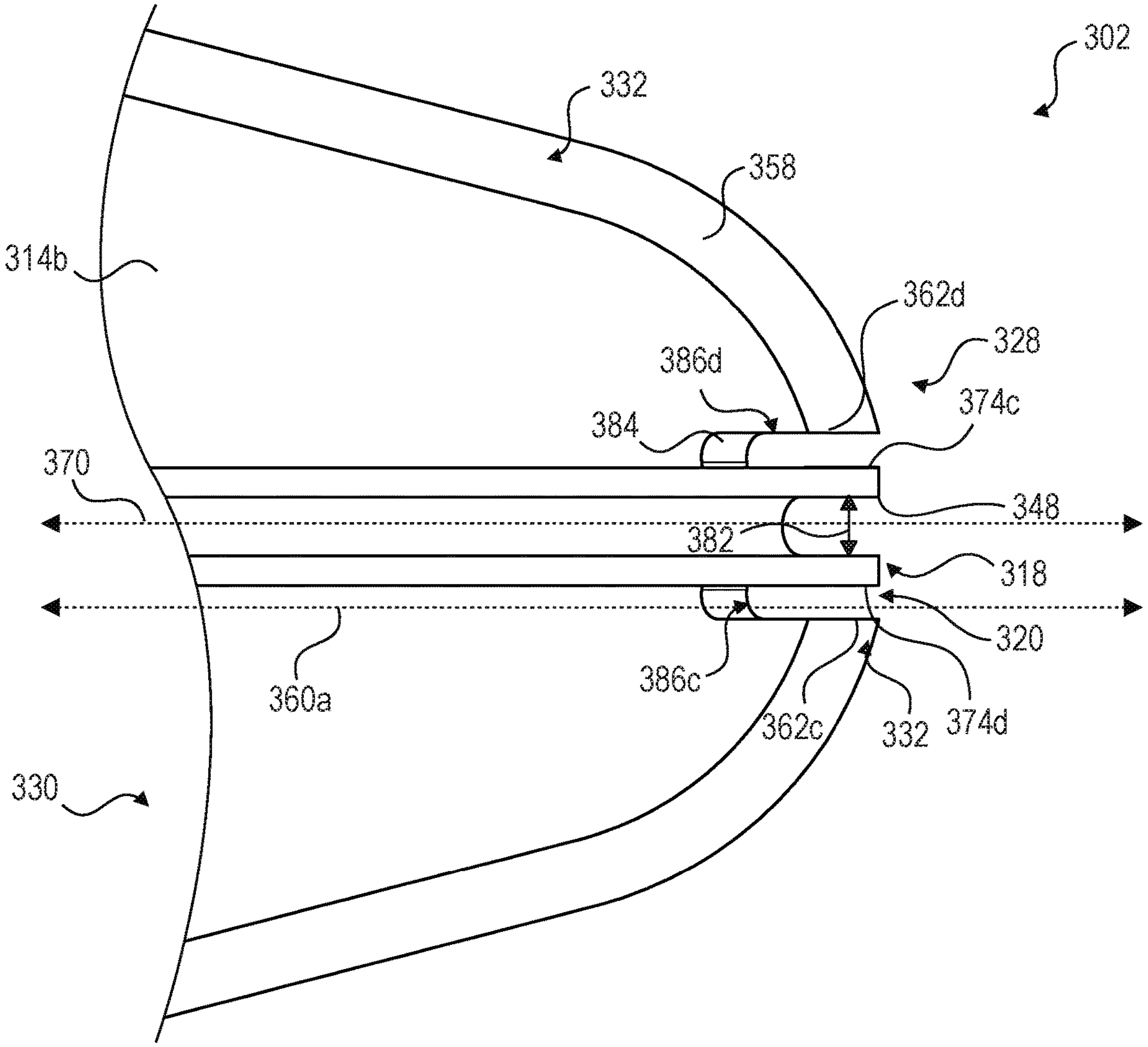
FIG. 3F is a top cross-sectional view of the nozzle body of FIG. 3E taken along a transverse plane.
Figure 6A:
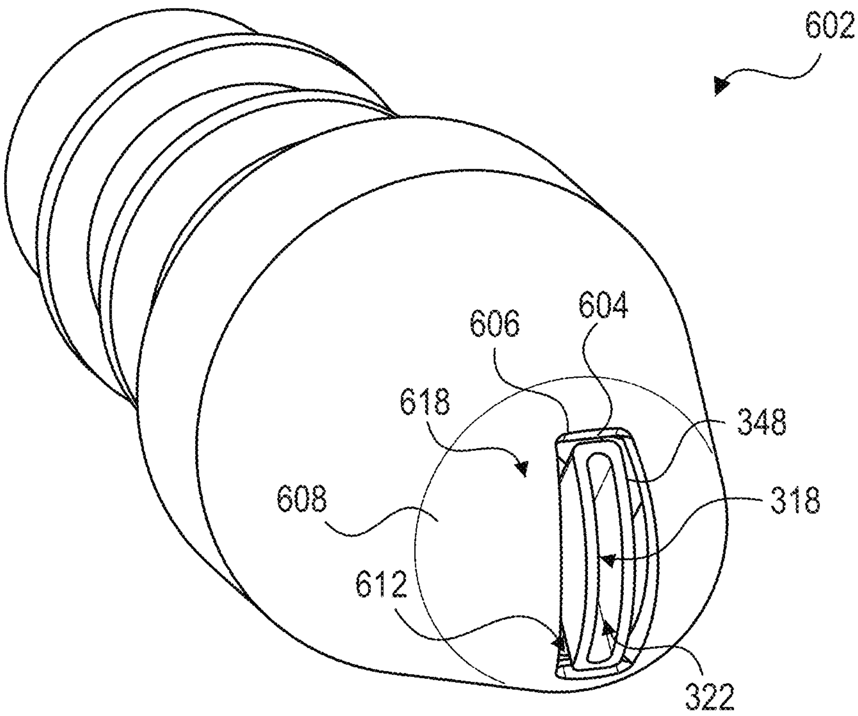
FIG. 6A illustrates a nozzle body in accordance with one embodiment.
Figure 6B:
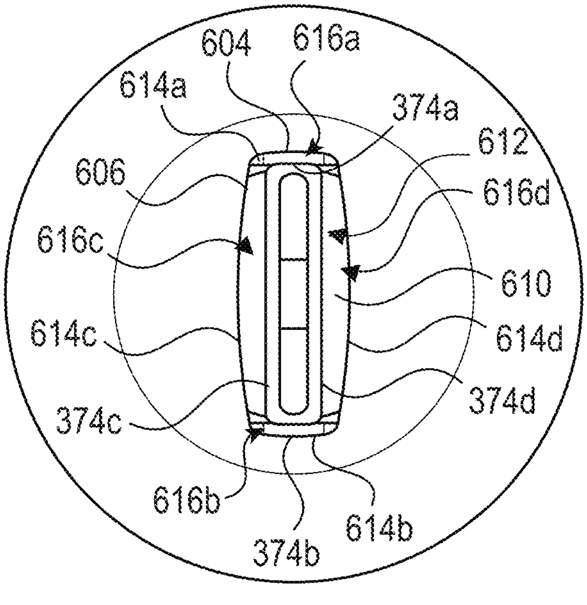
FIG. 6B illustrates the nozzle body of FIG. 6A in accordance with one embodiment.

In at least one embodiment, the first fluid opening 322 is rectangular in shape when viewed cross-sectionally at a frontal plane (similar to the view in FIG. 6B). Although the dimensions of the first fluid opening 322 may vary with application, typically the height (e.g., outer arcuate edge height dimension 366 or the first fluid opening height dimension 368 defined by the arcuate edge portion 374*c*) is greater than the width as shown in FIG. 3D-FIG. 3F (e.g., width dimension 382 of the first fluid opening 322 as measured from arcuate edge portion 374*c* to arcuate edge portion 374*d*).

In at least one embodiment, the height can be measured based on the circumference along the arcuate edge 348 or the height, as used herein, is the arcuate length as measure from opposing wall portions within the longitudinal plane 102. In at least one embodiment, the height of the first fluid opening 322 is at least 1.01-100 times as great as its width, more particularly 10-30 times as great as its width.

The width, as used herein, is the average distance between opposing wall portions within the transverse plane 104. In at least one embodiment, a dimension of the arcuate edge portion 374*a* and arcuate edge portion 374*b* can define a width dimension 382. In at least one embodiment, the space between the arcuate edge portion 374*c* and arcuate edge portion 374*d* can define the width dimension 382.

In some embodiments, irrespective of the curvature, the rectangular slot of the first fluid opening 322 projects a rectangular shape onto a longitudinal plane 102.

However, the shape of the first fluid opening 322 in the frontal plane is not particularly limiting. In some embodiments, first fluid opening 322 is a slit or slot. Although used interchangeably, a slit can often be longer and thinner than a slot. In alternative embodiments, the first fluid opening 322 can be in the shape of a regular or an irregular oval, rectangle or semicircle. In some embodiments, the first fluid passageway outlet 306*b* projects a rectangular shape onto the longitudinal plane 360*a*.

In at least one embodiment, the first fluid opening 322 can be arcuate when viewed cross-sectionally at one plane (shown arcuate in the longitudinal plane in FIG. 3D and FIG. 3E). For example, the first fluid nozzle tip 318 can have portions that are arcuate. In at least one embodiment, the first fluid nozzle tip 318 can have at least two wall portions that are arcuate. The first fluid opening 322 can be formed by at least two edges (e.g., arcuate edge portion 374*a*, arcuate edge portion 374*b*, arcuate edge portion 374*c*, and arcuate edge portion 374*d*).

As shown in FIG. 3D, the first fluid opening 322 is formed by four arcuate edge portions. In at least one embodiment, the first fluid passageway can also be formed at least in part from arcuate wall portions formed from the thickness of the first fluid nozzle tip 318. The arcuate wall portions are arcuate because they have one portion/face that is arc shaped.

In at least one embodiment, the first fluid opening 322 can have a fan-shape when viewed along a longitudinal plane, with the fan-shape expanding as the first fluid passageway 228 continues toward the first fluid nozzle tip 318. In at least one embodiment, the arcuate edge 348 can have an arcuate shape on one edge that follows the curvature of a dome-shaped portion of the second fluid nozzle tip 388. In at least one embodiment, the arcuate edge 348 can have a thickness that forms the fan-shape.

The second fluid passageway inlet 310*a* can provide the second fluid to the second fluid passageway outlet 310*b* via the second fluid passageway 308 formed within nozzle body 206.

In at least one embodiment, the longitudinal axis 324 can be defined by the second fluid passageway 308, an alignment of the second fluid passageway inlet 310*a* and the second fluid passageway outlet 310*b*, or the flow of the second fluid.

In at least one embodiment, the second fluid passageway 308 can be substantially formed from second tubular member 334. The rear surface 326 of the second tubular member 334 can include the rear surface 326 which forms an opening 338 for the second fluid passageway inlet 310*a*.

In at least one embodiment, second fluid passageway inlet 310*a* is disposed on the nozzle body 302 and connects either directly or indirectly to a second fluid source. The location of the second fluid passageway inlet 310*a* is not particularly limiting but is generally positioned so that the second fluid second fluid source does not interfere with the atomization and dispensing of fluid. In one embodiment, the second fluid passageway inlet 310*a* is located on the rear surface 326 of the nozzle body 302. In an alternative embodiment, the second fluid passageway inlet 310*a* is located on the front surface 328 of the nozzle body 302. In yet other embodiments, the second fluid passageway inlet 310*a* is located on portions of both the front surface 328 and rear surface 326 of the nozzle body 302.

The shape of the second fluid passageway inlet 310*a* is not particularly limiting. However, the portion of the nozzle body 302 containing the second fluid passageway inlet 310*a* is typically configured to attach either directly or indirectly to an external second fluid source. In the exemplary embodiment, the second fluid passageway inlet 310*a* comprises tabs configured to mate with a complementary means of attachment, such as slots in the housing of a second fluid source or the slots in a conduit (e.g., tubing) used to supply the second fluid from the second fluid source. The nozzle body 302 can be easily configured for other known means of attachment, including threading, snap fit, press fit, quick disconnect, compression fitting, hose barb, ultrasonic welding, spin welding, and overmolding. For example, the second tubular member 334 can also include connection member 312 which can facilitate connection to a second fluid source or actuator. As shown, the connection member 312 is a ridge or barb that enables a press-fit connection to a pneumatic hose or quick-connect coupler.

The second tubular member 334 can be arranged along the longitudinal axis 324 as shown in FIG. 3A and FIG. 3B. The second tubular member 334 can include exterior surface 314*a* and interior surface 314*b*. As used herein, exterior surface 314*a* and exterior surface 336*a* can also refer to the exterior surfaces of the nozzle body 302 as a whole.

In some embodiments, at least a portion of the second tubular member 334 is a cylindrical cavity having a constant cross-sectional area throughout. In at least one embodiment, at least a portion of the second tubular member 334 is a cylindrical cavity in which the cross-sectional area of the second fluid passageway 308 varies in the frontal plane. At least a portion of the second tubular member 334 is a cylindrical cavity where the cross-sectional area decreases from the second fluid passageway inlet 310*a* to the second fluid passageway outlet 310*b* when viewed in the longitudinal plane, thus decreasing the pressure and increasing the velocity with which the second fluid exits the second fluid opening 320 as shown in FIG. 3C.

In at least one embodiment, the first tubular member 316 can also include the cone-shaped portion 330. The cone-shaped portion 330 can taper into the dome-shaped portion 332 of the second fluid nozzle tip 388. In at least one embodiment, the cone-shaped portion 330 can form a part of either the second fluid nozzle tip 388 or the first tubular member 316 depending on the configuration. For example, if the second fluid nozzle tip 388 is separable from the first tubular member 316, and the cone-shaped portion 330 is integral with the dome-shaped portion 332, then the cone-shaped portion 330 is disposed on the second tubular member 334.

In at least one embodiment, the cone-shaped portion 330 can form a chamber 340 funneling into the second fluid nozzle tip 388 so that as second fluid travels in the second fluid passageway 308 the second fluid has higher pressure relative to second fluid at the rear surface 326. The second tubular member 334 can be arranged to form the cone-shaped portion 330 which can taper into the dome-shaped portion 332 on an exterior surface of the second tubular member 334.

The nozzle body 302 also includes second fluid nozzle tip 388. The second fluid nozzle tip 388 can have a second fluid opening 320 formed therein and form a portion of the second fluid passageway 308. The second fluid passageway outlet 310*b* can refer to the second fluid opening 320 and vice versa.

The second fluid nozzle tip 388 can include a dome-shaped portion 332 that directs air into the second fluid opening 320 formed therein. The dome-shaped portion 332 can further taper into the second fluid opening 320. Second fluid can flow into the second fluid passageway inlet 310*a* and exit through the dome-shaped portion 332. In at least one embodiment, the second fluid nozzle tip 388 is configured to be removed from the first tubular member 316 (e.g., to reduce waste). For example, the dome-shaped portion 332 can be detachable from the cone-shaped portion 330.

The dome-shaped portion 332 can direct second fluid into the second fluid opening 320 to change the pressure, direction, and/or velocity of the second fluid relative to the first fluid. It was found that the dome-shaped portion 332 can reduce the airflow required to form the fan-shaped atomized spray pattern. Particularly, when configured as an external-mix two-fluid nozzle.

The dome-shaped portion 332 can include the dome face 358 on the exterior surface 314*a*. The dome-shaped portion 332 can have a second fluid opening 320 formed therein. The second fluid opening 320 can interrupt a portion of the dome face 358. The second fluid opening 320 can be formed from a dome interior edge of the dome-shaped portion 332.

The dome-shaped portion 332 can form at least part of the front surface 328. In at least one embodiment, the dome-shaped portion 332 can have a dome interior edge 392 forming a second fluid opening 320 therein. The dome interior edge 392 can collectively form a perimeter 384. The dome interior edge 392 can define a rectangular, arcuate slot that follows the contours of the dome-shaped portion 332.

The second fluid opening 320 and the dome interior edge 392 can form part of the second fluid passageway outlet 226. Thus, the second fluid can be transported from the second fluid passageway inlet 310*a* through the second tubular member 334 and can be concentrated in the cone-shaped portion 330 and dome-shaped portion 332 to form a high-pressure region as shown in FIG. 3D. The second fluid can be dispensed through the second fluid opening 320 at pressure. In at least one embodiment, the pressure can be at least 2 bars, at least 2.5 bars, or at least 3 bars.

The dome interior edge 392 can include at least four dome interior edges, two pairs of dome interior edges are each opposed to one another. For example, the dome interior edge 392 can include dome interior edge portion 362*a*, and dome interior edge portion 362*b* (described in FIG. 3E) and dome interior edge portion 362*d* and dome interior edge portion 362*c* (described in FIG. 3F). Collectively, the dome interior edge 392 and the arcuate edge portion 374*c* of first tubular member 316 can form the second fluid opening 320.

In at least one embodiment, at least one portion of the second fluid opening 320 can be aligned along the longitudinal plane 360*a*.

The second fluid opening 320 can be formed by a space or gap 378 between the dome interior edge 392 and the arcuate edge 348. FIG. 3F shows that the second fluid opening 320 in the dome-shaped portion 332 can include both second fluid opening portion 386*c* and second fluid opening portion 386*d* which are separated by the first fluid nozzle tip 318. The second fluid opening portion 386*c* and second fluid opening portion 386*d* can both have different longitudinal planes that are parallel to each other.

In at least one embodiment, the dome interior edge portion 362*d* and arcuate edge portion 374*c* can define the second fluid opening portion 386*d* and the dome interior edge portion 362*c* and arcuate edge portion 374*d* define the second fluid opening portion 386*c*.

The second fluid opening 320 can also include top and bottom second fluid opening portions. The second fluid opening portion 386*a* can be formed by dome interior edge portion 362*a* within the dome-shaped portion 332 and the arcuate edge portion 374*a*. In at least one embodiment, the arcuate edge portion 374*a* can be on the outside the first fluid nozzle tip 318 to form the boundary of second fluid opening 386*b*. The second fluid opening portion 386*b* can be formed by dome interior edge portion 362*b* and the arcuate edge portion 374*b*. The second fluid opening portion 386*a* and second fluid opening portion 386*b* can be formed between gaps in the wall portions and the dome interior edges (e.g., gap 378).

As shown, the distal-most portion of the first fluid nozzle tip 318 and dome-shaped portion 332 may be flush or aligned on the front surface 328 along a frontal plane of the nozzle body 302.

In at least one embodiment, the width dimension 382 can be greater than the width of the second fluid opening portion 386*d* or second fluid opening portion 386*c*. For example, the second fluid opening portion 386*c* or 386*d* can be a gas opening adjacent to the liquid opening. The width of the second fluid opening portion can be the distance from an outer surface of the first fluid nozzle tip 318 to an inner surface of the second 362*c* or 362*d*. The width can be the space between side dome interior edges and an arcuate edge wall of the first fluid nozzle tip 318. In at least one embodiment, the width dimension 382 can be at least 1.5 or 2 times greater than the width of the second fluid opening portion 386*c* or second fluid opening portion 386*d*.

As shown, the arcuate edge 348 of the first fluid nozzle tip 318 follows the contours of the dome interior edge 392 of the second fluid nozzle tip 388. For example, the first fluid opening 322 can have the same general profile as the second fluid opening 320. In at least one embodiment, the second fluid opening 320 is arcuate and the dome-shaped portion 332 is optional.

The first fluid opening 322 can be disposed at least partially within the second fluid opening 320 so that the flow of second fluid can atomize the first fluid. In at least one embodiment, the second fluid opening 320 surrounds the first fluid opening 322. Thus, the second fluid nozzle tip 388 can be coaxial with the first fluid nozzle tip 318. In at least one embodiment, the second fluid opening portion 386*c* can be on one side of the first fluid nozzle tip 318 adjacent to the first fluid opening 322 (separated by arcuate edge portion 374*c*). The second fluid opening portion 386*d* can be on the other side of the first fluid nozzle tip 318 directly opposing second fluid opening portion 386*c* and adjacent to the first fluid opening 322 and separated by arcuate edge portion 374*d*.

The second fluid opening portion 386*c* can form a first longitudinal plane, second fluid opening portion 386*d* can form a second longitudinal plane. The first and second longitudinal planes can be parallel to one another and parallel to the plane formed by second fluid opening 320. In at least one embodiment, the transverse plane formed by second fluid opening portion 386*a* and/or second fluid opening portion 386*b* can be orthogonal to the plane of the second fluid opening 320. In at least one embodiment, the second fluid opening portion 386*a* can have a smaller area than second fluid opening portion 386*c*.

In at least one embodiment, first fluid can be drawn through the first fluid passageway inlet 306*a* through the first tubular member 316 and expelled through the first fluid opening 322 in the first fluid nozzle tip 318. The second fluid, when expelled through the second fluid passageway outlet 310*b* can draw the first fluid through the first fluid passageway 304 via the Venturi effect. The first fluid expelled through the first fluid opening 322 can be atomized with the second fluid.

Figure 4A:
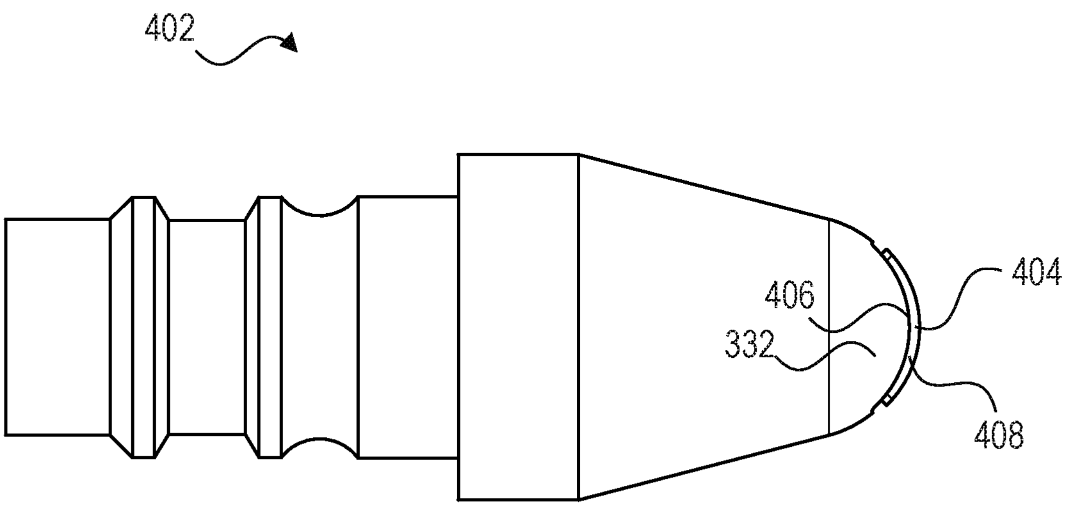
FIG. 4A illustrates a nozzle body in accordance with one embodiment.
Figure 4B:
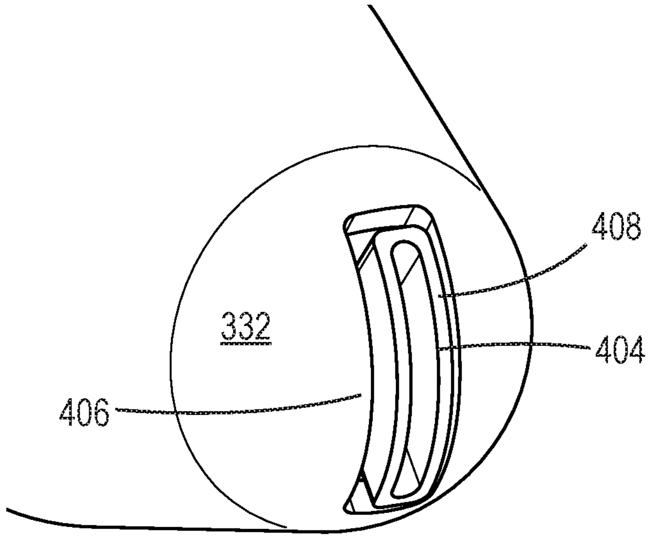
FIG. 4B illustrates the nozzle body of FIG. 4A in accordance with one embodiment.

FIG. 4A and FIG. 4B illustrate a nozzle body 402 which is an alternative embodiment of nozzle body 206. For example, the second fluid nozzle tip of nozzle body 402 can be the same as second fluid nozzle tip 388. In at least one embodiment, the distal-most portion 404 of first fluid nozzle tip 408 can extend beyond the distal-most portion 406 of the dome-shaped portion 332 to make an external-mix two-fluid nozzle as shown in FIG. 4A and FIG. 4B.

Figure 5:
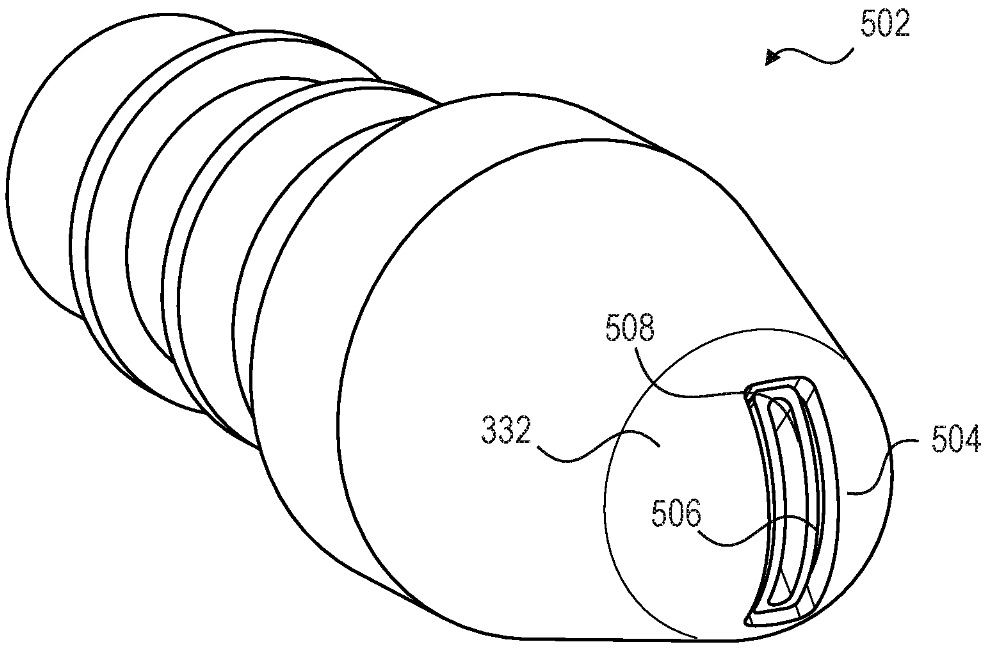
FIG. 5 illustrates a nozzle body in accordance with one embodiment.

FIG. 5 illustrates a nozzle body 502 which is an alternative embodiment of nozzle body 206. For example, the second fluid nozzle tip of nozzle body 502 can be the same as second fluid nozzle tip 388. In at least one embodiment, the distal-most portion 506 of the first fluid nozzle tip 508 can be recessed from the distal-most portion 504 of the dome-shaped portion 332 along the frontal plane as shown in in FIG. 5. The first fluid nozzle tip 508 can be recessed such that the distal-most portion 506 of the first fluid nozzle tip 318 forms an internal-mix two-fluid nozzle. In at least one embodiment, the distal-most portion 506 does not extend more than halfway of the depth of the dome-shaped portion 332 (along a longitudinal axis).

FIG. 6A and FIG. 6B illustrate a nozzle body 602 which is an alternative embodiment of nozzle body 206. Nozzle body 602 can be identical to nozzle body 302 except that the second fluid opening 612 of the second fluid nozzle tip 618 is a different shape. The nozzle body 602 can include the first fluid passageway 304 (which is arranged the same as in nozzle body 302). For example, a first fluid opening 322 can be formed from arcuate edge 348 and can be a fan-shape. The arcuate edges 348 can include arcuate edge portion 374*a*, arcuate edge portion 374*b*, arcuate edge portion 374*c*, and arcuate edge portion 374*d*.

The nozzle body 602 can also include the second fluid nozzle tip 618 formed within the nozzle body 602. The second fluid nozzle tip 618 can include the second fluid opening 612 formed in the dome-shaped portion 608. For example, the dome-shaped portion 608 can have a dome interior edge 606 which has a perimeter. The dome interior edge 606 can include dome interior edge portion 614*a*, dome interior edge portion 614*b*, dome interior edge portion 614*c*, and dome interior edge portion 614*d*.

The second fluid opening 612 can be defined by the dome interior edges 606. As shown in FIG. 6B, the second fluid opening 612 can be in the shape of a superellipse.

The second fluid opening 612 can be further divided into multiple second fluid openings. For example, the second fluid opening 612 can include second fluid opening portion 616*a*, second fluid opening portion 616*b*, second fluid opening portion 616*c*, and second fluid opening portion 616*d*. The second fluid opening portion 616*a* can be formed from a longitudinal gap 604 between arcuate edge portion 374*a* and dome interior edge portion 614*a*. The second fluid opening portion 616*b* can be formed from a longitudinal gap between the arcuate edge portion 374*b* and dome interior edge portion 614*b*. The second fluid opening portion 616*c* can be formed from a transverse gap between arcuate edge portion 374*c* and dome interior edge portion 614*c*. The second fluid opening portion 616*d* can be formed from a transverse gap 610 between arcuate edge portion 374*d* and dome interior edge portion 614*d*. In at least one embodiment, the transverse gap 610 is greater than the longitudinal gap 604.

In at least one embodiment, the dome interior edge portion 614*c* and dome interior edge portion 614*d* expand outwardly from the first fluid opening 322. In at least one embodiment, any portion of the dome interior edge 606 can be coupled to any portion of the arcuate edge 348. For example, the dome interior edge portion 614*a* and arcuate edge portion 374*a* or dome interior edge portion 614*b* and arcuate edge portion 374*b* can be connected through a connection member. In one example, the connection member can be integral to both the dome interior edge portion 614*a* and arcuate edge portion 374*a*. In another example, the connection member can be an adhesive or mechanical fastener that does not significantly interfere with the second fluid flow. The connection member can maintain the separation between the dome interior edge 606 and arcuate edge 348.

Figure 7:
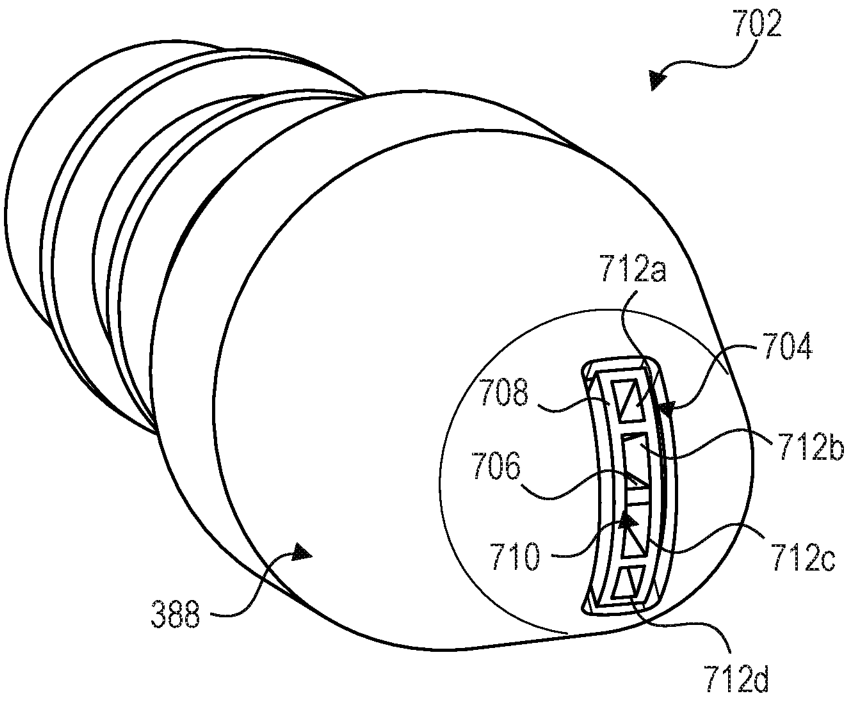
FIG. 7 illustrates a nozzle body in accordance with one embodiment.

FIG. 7 illustrates nozzle body 702 which is an alternative embodiment of nozzle body 206. The nozzle body 702 can be identical to nozzle body 302 except that the first fluid passageway 704 has a different first fluid nozzle tip 708. For example, the nozzle body 702 can include the second fluid nozzle tip 388 which is identical to nozzle body 302 and provides the second fluid.

While the first fluid nozzle tip 318 forms a single, uninterrupted rectangular slot, the first fluid nozzle tip 708 (and the first fluid opening 710) can be partitioned into two or more sections to create a plurality of openings (e.g., opening 712*a*, opening 712*b*, opening 712*c*, and opening 712*d*). The openings can be of varied or uniform shapes and/or sizes. The baffle walls 706 making up each section can be featureless.

Figure 8:
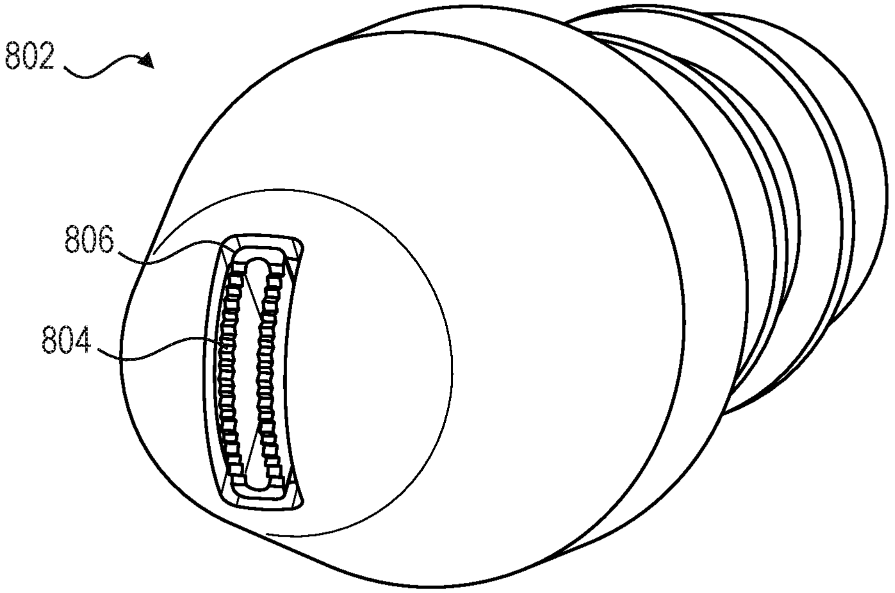
FIG. 8 is a nozzle body in accordance with one embodiment.

FIG. 8 illustrates nozzle body 802 which is an alternative embodiment of nozzle body 206. The nozzle body 802 can be identical to nozzle body 302 except that the arcuate edge 806 can include portion feature 804. In at least one embodiment, the portion feature 804 can be used to modify the fluid flow. The portion feature 804 can be disposed on a surface of the arcuate edge 806. Examples of portion feature 804 can include grooves, pillars/posts, and various textures.

Figure 9A:
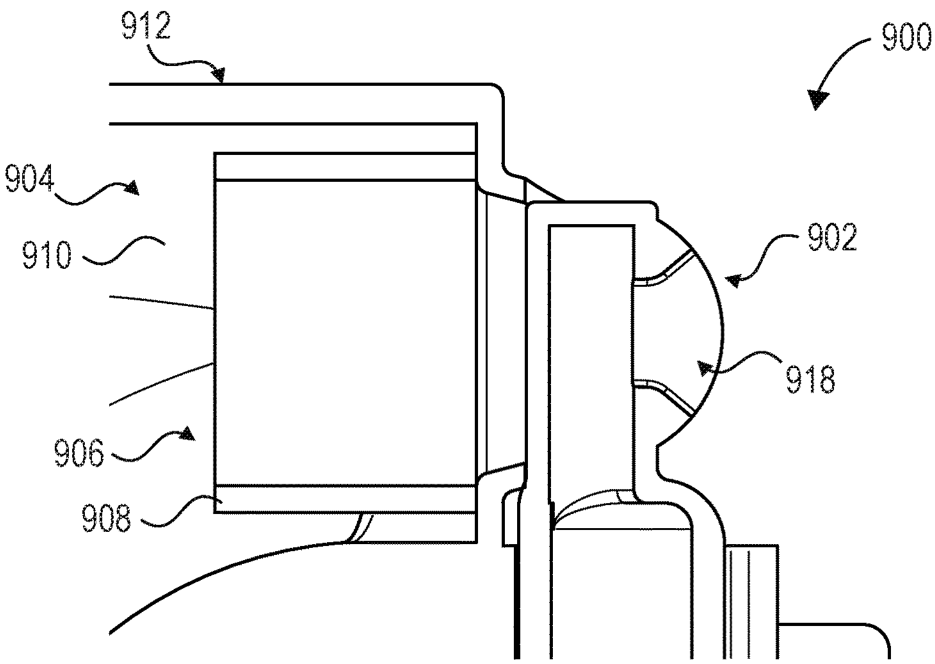
FIG. 9A is a cross-sectional view of a nozzle body in accordance with one embodiment taken along a longitudinal plane.
Figure 9B:
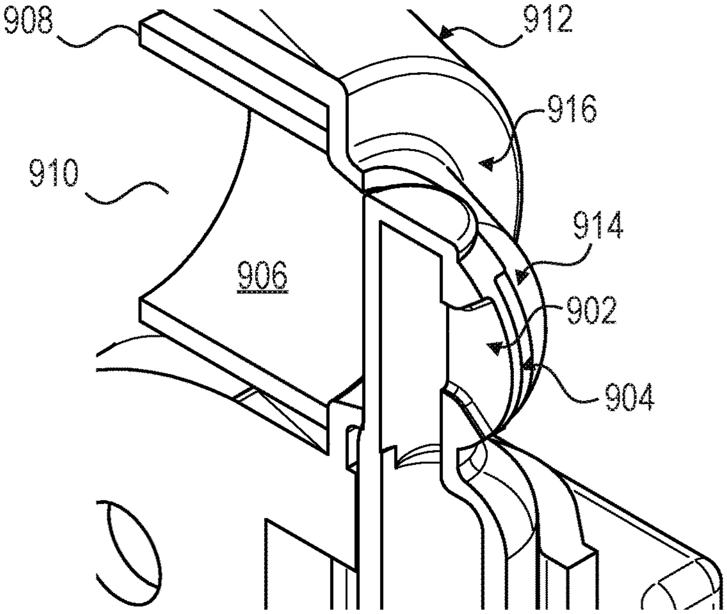
FIG. 9B is a perspective cross-sectional view of the embodiment of FIG. 9A in accordance with one embodiment.

FIG. 9A and FIG. 9B illustrate nozzle body 900 which is an embodiment of nozzle body 206 in FIG. 2. The nozzle body 900 is similar to nozzle body 302. For example, the nozzle body 900 can have a first fluid passageway 902 and second fluid passageway 904 formed therein. The nozzle body 900 can have a first fluid nozzle tip 918. The nozzle body 900 can include a second tubular member 912 with an interior surface 910. A baffle 906 can be disposed on the interior surface 910 proximate to or within the second fluid nozzle tip 914. The baffle 906 can be formed from at least one baffle wall 908. The baffle 906 can be configured to disrupt the gas flow from the second fluid source. In at least one embodiment, the baffle wall 908 is continuous and forms an annular ring. In another embodiment, the baffle wall 908 can also be discontinuous and include any of a plurality of walls. As shown, the baffle wall 908 is cylindrical but can also be any shape (polygonal, triangular, elliptical). In at least one embodiment, the width dimension (as measured along a transverse plane) can be greater than the width dimension of a base portion of the dome-shaped portion 916. The width dimension can be a diameter (or minor axis if elliptical) of the baffle 906.

Figure 10:
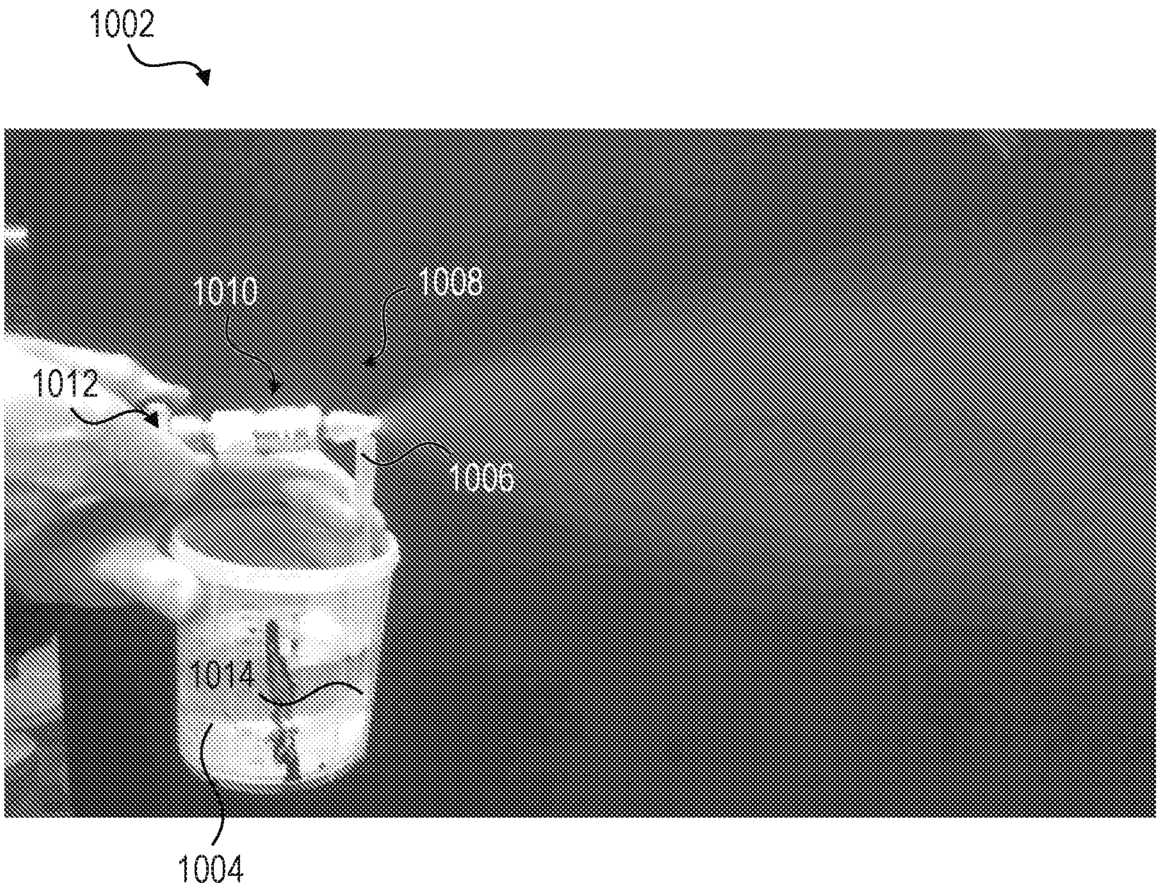
FIG. 10 illustrates a spraying apparatus in accordance with one embodiment.

FIG. 10 illustrates a spraying apparatus 1002 that is an embodiment of spraying apparatus 202. For example, the spraying apparatus 1002 can include a second fluid source 1012 that is connected to connection member 1010 which facilitates the connection to two-fluid nozzle 1008. The two-fluid nozzle 1008 can be any nozzle body configured described herein. The two-fluid nozzle 1008 can include siphon tube 1006 that siphons first fluid 1014 from container 1004.

The spraying apparatus 1002, and two-fluid nozzle 1008 contained therein, is designed to take advantage of the Venturi effect in certain instances. For example, as pressurized gas is expelled through a second fluid opening, the second fluid can create a low-pressure zone adjacent to the first fluid opening. The low-pressure zone draws, or assists drawing, the first fluid through the first fluid opening into the low-pressure zone and the path of the pressurized gas. A shearing force of the pressurized gas on the first fluid leads to atomization of the first fluid.

Although the low-pressure zone is often sufficient to pull the first fluid through the first fluid opening, it should be understood that the first fluid may be dispensed while under hydrostatic pressure and/or pressurized by an external source of air. For example, is some embodiments, the container 1004 may be elevated above the two-fluid nozzle 1008 (along the longitudinal plane) during operation. In such instances, dispensing of the first fluid from the first fluid opening will be influenced by the both Venturi effect and the hydrostatic pressure arising from the position of the container 1004 above the two-fluid nozzle 1008. In other embodiments, the first fluid may be pressurized by, for example, a pump or an external source of air.

The shaping of the atomized fluid is facilitated by a rectangular slot and the second fluid openings that spreads the atomized first fluid into a flat-fan pattern. The size of the flat fan pattern is influenced by the dimensions of the second fluid openings, and/or the dimensions of the first fluid opening.

Since the function of shaping and atomizing are combined into one airstream, the two-fluid nozzles of the present disclosure are much simpler than the traditional air-atomizing, air-spray, air-assist or air-blast atomization methods that require the adjustment of multiple air streams. Moreover, there is no need for one or more separate streams of pressurized air to shape the atomizer fluid, thus reducing the pressurized air consumption by as much as half.

Thus, the present disclosure provides, among other things, atomizers, systems that contain such atomizers, and methods that utilize such atomizers. Various features and advantages of the present disclosure are set forth in the following claims.

The term "comprises" and variations thereof do not have a limiting meaning where these terms appear in the description and claims. Such terms will be understood to imply the inclusion of a stated step or element or group of steps or elements but not the exclusion of any other step or element or group of steps or elements. The term "consisting of" is limited to whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

In this application, terms such as "a," "an," and "the" are not intended to refer to only a singular entity, but include the general class of which a specific example may be used for illustration. The terms "a," "an," and "the" are used interchangeably with the phrases "at least one" and "one or more." The phrases "at least one of" and "comprises at least one of" followed by a list refers to any one of the items in the list and any combination of two or more items in the list.

The term "or" is generally employed in its usual sense including "and/or" unless the content clearly dictates otherwise.

The term "and/or" means one or all of the listed elements or a combination of any two or more of the listed elements.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

Reference throughout this specification to "some embodiments" means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances; however, other embodiments may also be preferred, under the same or other circumstances. Furthermore, the recitation of one or more preferred embodiments does not imply that other embodiments are not useful, and is not intended to exclude other embodiments from the scope of the disclosure.

The words "top", "bottom", "front" and "rear" are relative terms that are not meant to apply a particular orientation in space.

"Adjacent" refers to next to, adjoining, or disposed partially within something else. Adjacent can also refer to a portion of something (such as an opening) is next to or adjoining another portion of something (another opening). Adjacent can also refer to being disposed within something else. For example, the first fluid nozzle tip can be at least partially disposed within the second fluid nozzle tip (e.g., where part of the boundaries of the second fluid nozzle tip overlaps with boundaries of the first fluid nozzle tip) and be adjacent to the second fluid nozzle tip.

"Arcuate" refers to shaped like a bow or curved.

"Dome" refers to a partially spherical shape. For example, the dome can be comprised of two consecutive quadrants of a sphere. A dome does not have to have a regular three-dimensional object in which every cross-section is a circle.

"Dome face" refers to comprised of two consecutive quadrants of a sphere.

"External-mix two-fluid nozzle" refers to a configuration where mixing of the gas and the first fluid occurs outside of the two-fluid nozzle.

"Fan-shape" refers to shaped like a segment of a circle.

"Fluid" refers to one or more flowable materials including, for example, a solid, a first fluid, a gas or combinations thereof. The fluid can be a single material or a combination of two or more materials of the same or different phase (e.g., a slurry of solvent and solid particles). In the case of first fluid spray guns used in vehicle repair, fluid may include paints, primers, base coats, lacquers, varnishes and similar paint-like materials as well as other materials, such as adhesives, sealer, fillers, putties, powder coatings, blasting powders, abrasive slurries, mold release agents and foundry dressings.

"Fluidically isolated" refers to not being able to combine. For example, a first fluid passageway that is not capable of mixing with a second fluid passageway.

"Fully contained" refers to being completely within. Can also be sealed or encapsulated.

"Hydrostatic pressure" refers to the pressure that is exerted by a fluid at equilibrium at a given point within the fluid, due to the force of gravity. Hydrostatic pressure increases in proportion to depth as measured from the surface due to the increasing fluid weight exerting downward force from above. Hydrostatic pressure can be used to describe the effect of a container which acts as a fluid source connected to an atomizer. The height, and thus the weight, of the fluid in the container will impart a motive force on the fluid entering the atomizer.

"Internal-mix two-fluid nozzle" refers to a configuration where mixing of the gas and the first fluid occurs inside of the two-fluid nozzle.

"Leaf cavity" refers to a fan-shape having a thickness to form a three-dimensional segment of a circle.

"Longitudinal plane" refers to a plane that divides the nozzle body into two left and right sections. The left and right sections can be substantially mirror images of each other.

"Parallel" refers to side by side and having the same distance between two axes or planes. Parallel can have a tolerance from −10 to 10 degrees.

"Pressure" refers to the gauge pressure (i.e., measurement of fluid pressure relative to ambient atmospheric pressure). A fluid pressure above ambient atmospheric pressure exhibits positive pressure and a fluid pressure below ambient atmospheric pressure exhibits negative pressure. Negative pressure conditions can also be referred to as "a vacuum", "a partial vacuum", or "suction conditions".

"Pressurized" refers to being placed under pressure. The term pressurized can exclude hydrostatic pressure.

"Rectangular" refers to a quadrilateral with equal angles. Rectangular can mean a four-sided polygon having one set of parallel sides orthogonal to a second set of parallel sides. The two sets of parallel sides may be the same length (i.e., form a square). One set of parallel sides is longer than the other set of parallel sides. The sides may be regular or irregular (e.g., curved sawtooth pattern, curved sinusoidal pattern, a discretized or stepped curve pattern, and combinations thereof), and the corners of the polygon may be squared, rounded or a combination thereof. Rectangular can also refer to a superellipse.

"Superellipse" refers to a shape where the set of all points (x, y) on the curve satisfy the equation:

$$\left|\frac{x}{a}\right|^n + \left|\frac{y}{b}\right|^n = 1,$$

where n, a and b are positive numbers. In at least one embodiment, the value of n can be greater than 1. In at least one embodiment, the value of n can be between 1 and 2. In at least one embodiment, the value of n can be greater than 2 forming a rounded rectangle.

"Tubular member" refers to a structure that is round and hollow. The length dimension can be longer than the diameter. Round in this context can mean having one or more curves is not limited to regular, or circular shapes but can also be ellipsoidal or irregular. Tubular can refer to having a circular, rhomboidal, polygonal, or ellipsoidal cross-section. The length dimension does not have to be featureless and can have features protrusions or depressions formed therein.

"Two-fluid nozzle" refers to a nozzle that is fed by a fluid passageway for delivering a flow of first fluid that is to be sprayed and by another fluid passageway for delivering a flow of gas. The two-fluid nozzle can be configured to put the first fluid and the gas into contact and atomize the first fluid.

What is claimed is:

1. A two-fluid nozzle comprising:

a nozzle body having a front surface, a rear surface, and a longitudinal axis extending between the front surface and the rear surface, the nozzle body comprising:

a first fluid nozzle tip comprising:

a distal end forming a portion of the front surface of the nozzle body; and a first fluid opening formed at the distal end of the first fluid nozzle tip, wherein the first fluid opening is arcuate and rectangular, wherein the first fluid opening is configured to provide a first fluid from a first fluid passageway inlet via a first fluid passageway formed at least partially from a first tubular member; and a second fluid nozzle tip comprising:

a distal end forming a portion of the front surface of the nozzle body; and a second fluid opening formed at the distal end of the second fluid nozzle tip, wherein the second fluid opening is arcuate and rectangular, and wherein the second fluid opening is configured to provide a second fluid from a second fluid passageway inlet via a second fluid passageway;

wherein the first fluid passageway and the second fluid passageway are at least partially within the nozzle body and are fluidically isolated from each other in the nozzle body;

wherein the second fluid opening is positioned adjacent to the first fluid opening such that, when flowing, the second fluid from the second fluid opening affects the first fluid from the first fluid opening.

2. The two-fluid nozzle of claim 1, wherein the distal end of the second fluid nozzle tip extends beyond the distal end of the first fluid nozzle tip.

3. The two-fluid nozzle of claim 1, wherein the distal end a distal most portion of the second fluid nozzle tip does not extend beyond the distal end of the first fluid nozzle tip.

4. The two-fluid nozzle of claim 1, wherein the first fluid nozzle tip is fan-shaped with a leaf cavity formed therein.

5. The two-fluid nozzle of claim 1, wherein the first fluid passageway and second fluid passageway are integrally formed in the nozzle body.

6. The two-fluid nozzle of claim 1, wherein the second fluid opening at least partially surrounds the first fluid opening.

7. The two-fluid nozzle of claim 1, wherein each of the first fluid opening and the second fluid opening are arcuate when viewed along a longitudinal plane parallel to the longitudinal axis, and each of the first fluid opening and the second fluid opening are rectangular when viewed along a frontal plane perpendicular to the longitudinal plane.

8. A spraying apparatus comprising:

the two-fluid nozzle of claim 1;

a first fluid source comprising a container fluidically coupled to the two-fluid nozzle; and a second fluid source fluidically coupled to the two-fluid nozzle.

9. The spraying apparatus of claim 8, wherein the container is flexible and configured to be squeezed by an operator without leakage.

10. A method of using the spraying apparatus of claim 8, the method comprising:

attaching the container to the two-fluid nozzle;

placing the two-fluid nozzle in front of a substrate;

attaching the second fluid source to the two-fluid nozzle;

dispensing the first fluid and the second fluid;

atomizing at least a portion of the first fluid to produce a flat fan pattern of atomized fluid; and coating the substrate with the atomized fluid.

11. A method of creating a flat fan spray with the apparatus of claim 8, the method comprising:

dispensing the second fluid from the second fluid passageway outlet;

producing a negative pressure on first fluid opening; and dispensing and atomizing the first fluid from the first fluid opening without shaping with air horns.

12. The two-fluid nozzle of claim 1, wherein the first fluid nozzle tip comprises an arcuate edge, the arcuate edge partially defines an outer arcuate edge height dimension of the first fluid opening.

13. The two-fluid nozzle of claim 12, wherein the first fluid nozzle tip further comprises at least one inner protrusion within the first fluid passageway, and the outer arcuate edge height dimension is greater than a height dimension of an opening at the at least one inner protrusion.

14. The two-fluid nozzle of claim 12, wherein the outer arcuate edge height dimension defined within a longitudinal plane of the two-fluid nozzle is greater than an outer arcuate edge width dimension of the first fluid opening defined within a transverse plane of the two-fluid nozzle.

15. The two-fluid nozzle of claim 1, wherein the second fluid opening completely surrounds the first fluid opening.

16. A two-fluid nozzle comprising:

a nozzle body comprising:

a first fluid nozzle tip comprising a first fluid opening formed therein, the first fluid opening is configured to provide a first fluid from a first fluid passageway inlet via a first fluid passageway formed at least partially from a first tubular member;

a second fluid nozzle tip comprising a second fluid opening formed therein, the second fluid opening is configured to provide a second fluid from a second fluid passageway inlet via a second fluid passageway;

wherein the first fluid passageway and the second fluid passageway are fluidically isolated from each other in the nozzle body;

wherein the first fluid opening and second fluid opening are each arcuate and rectangular;

wherein the second fluid opening is positioned adjacent to the first fluid opening such that, when flowing, the second fluid from the second fluid opening affects the first fluid from the first fluid opening, wherein the first fluid nozzle tip is fan-shaped with a leaf cavity formed therein, wherein the first fluid nozzle tip comprises an arcuate edge, and wherein the first fluid opening has an outer arcuate edge height dimension defined within a longitudinal plane of the nozzle body, and the arcuate edge partially defines the outer arcuate edge height dimension.

17. The two-fluid nozzle of claim 16, wherein the outer arcuate edge height dimension is greater than a height dimension proximate to a protruding portion within the first fluid passageway.

18. The two-fluid nozzle of claim 16, wherein the first fluid opening has an outer arcuate edge width dimension defined within a transverse plane of the nozzle body, and the outer arcuate edge height dimension is greater than the outer arcuate edge width dimension.

19. The two-fluid nozzle of claim 16, wherein the second fluid opening is formed in a dome face of a dome-shaped portion of the second fluid nozzle tip, and wherein the second fluid opening is formed by a dome interior edge having a perimeter and the arcuate edge is spaced apart from the perimeter on at least two sides.

20. A two-fluid nozzle comprising:

a nozzle body comprising:

a first fluid nozzle tip comprising a first fluid opening formed therein, the first fluid opening is configured to provide a first fluid from a first fluid passageway inlet via a first fluid passageway, wherein the first fluid passageway passageway formed at least partially from a first tubular member;

a second fluid nozzle tip comprising a second fluid opening formed therein, the second fluid opening is configured to provide a second fluid from a second fluid passageway inlet via a second fluid passageway;

wherein the first fluid passageway and the second fluid passageway are fluidically isolated from each other in the nozzle body;

wherein the first fluid opening and second fluid opening are each arcuate and rectangular;

wherein the second fluid opening completely surrounds the first fluid opening; and wherein, the second fluid opening is positioned adjacent to the first fluid opening such that, when flowing, the second fluid from the second fluid opening affects the first fluid from the first fluid opening.

* * * * *